(12) United States Patent
Maeda

(10) Patent No.: US 8,077,588 B2
(45) Date of Patent: Dec. 13, 2011

(54) DRIVING APPARATUS

(75) Inventor: Takanori Maeda, Saitama (JP)

(73) Assignee: Pioneer Corporation, Tokyo (JP)

( * ) Notice: Subject to any disclaimer, the term of this patent is extended or adjusted under 35 U.S.C. 154(b) by 576 days.

(21) Appl. No.: 11/989,295

(22) PCT Filed: Jul. 26, 2006

(86) PCT No.: PCT/JP2006/314769
§ 371 (c)(1),
(2), (4) Date: Mar. 16, 2009

(87) PCT Pub. No.: WO2007/013507
PCT Pub. Date: Feb. 1, 2007

(65) Prior Publication Data
US 2009/0217425 A1 Aug. 27, 2009

(30) Foreign Application Priority Data
Jul. 26, 2005 (JP) .................................. 2005-215819

(51) Int. Cl.
*G11B 9/00* (2006.01)
(52) U.S. Cl. ...................................................... 369/126
(58) Field of Classification Search .................. 369/126; 365/151; 977/943, 947; 250/309–311
See application file for complete search history.

(56) References Cited

U.S. PATENT DOCUMENTS
2006/0182004 A1* 8/2006 Maeda et al. ................. 369/126

FOREIGN PATENT DOCUMENTS
| JP | 05-028550 | | 2/1993 |
| JP | 05108908 A | * | 4/1993 |
| JP | 05-251524 | | 9/1993 |
| JP | 05-334737 | | 12/1993 |
| WO | WO 2005020226 A1 | * | 3/2005 |

OTHER PUBLICATIONS

English translation of Japanese Patent Publication JP05-108908A.*
International Search Report mailed Oct. 31, 2006.

* cited by examiner

*Primary Examiner* — Joseph Haley
*Assistant Examiner* — Nicholas Lee
(74) *Attorney, Agent, or Firm* — Nixon & Vanderhye P.C.

(57) ABSTRACT

A driving apparatus is provided with: a stage structure on which a medium having a small recording domain is mounted; and a facing structure which is provided with at least one small action structure, which faces the medium, for performing a predetermined action to the medium, and which is displaced relatively on a predetermined flat surface with respect to the stage structure, the facing structure comprising a facing-side position detecting unit for detecting a relative reference position of the facing structure with respect to the stage structure, the stage structure comprising a stage-side position detecting unit for detecting a relative reference position of the facing structure with respect to the stage structure.

14 Claims, 12 Drawing Sheets

[FIG. 1]
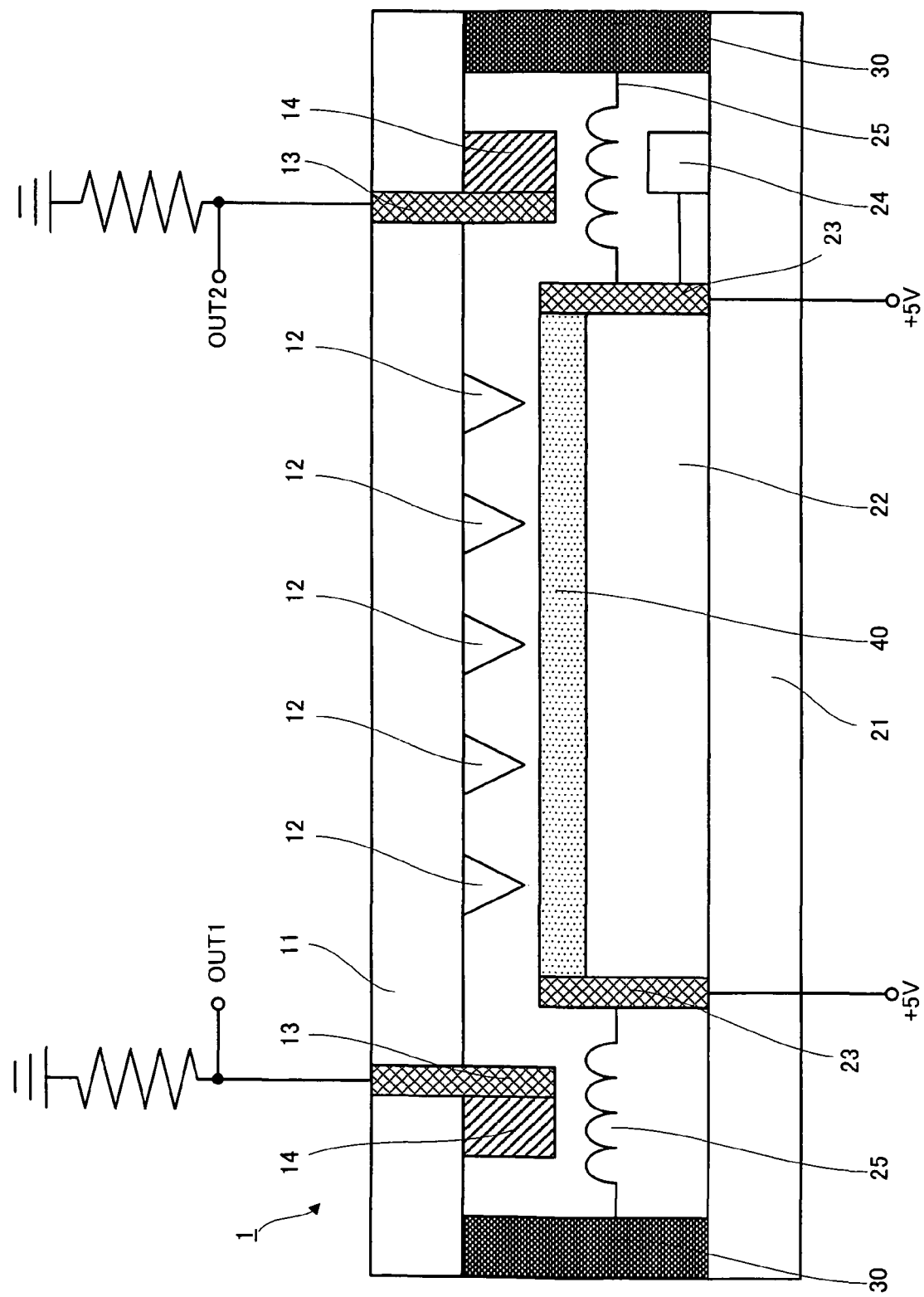

[FIG. 2]
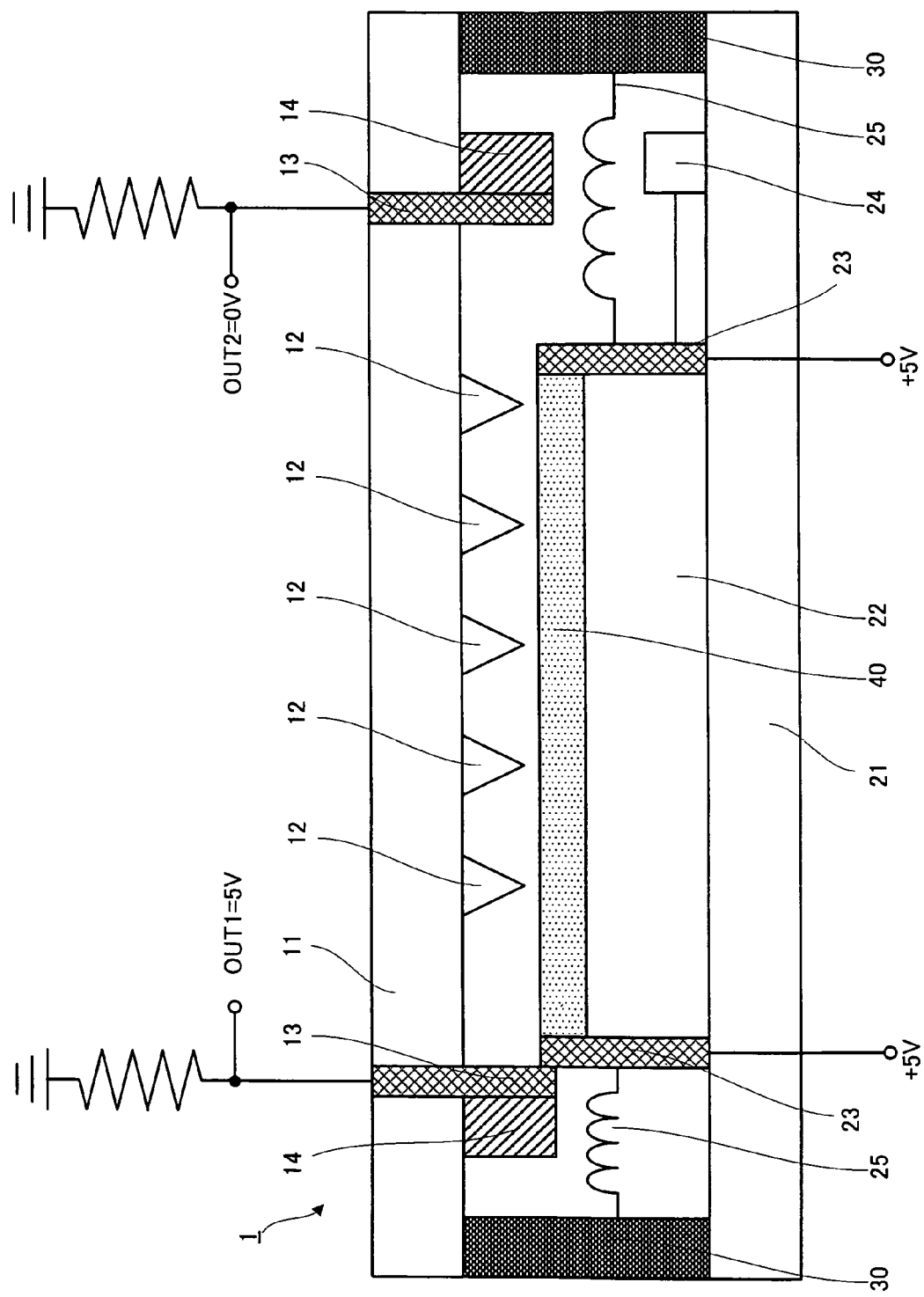

[FIG. 3]
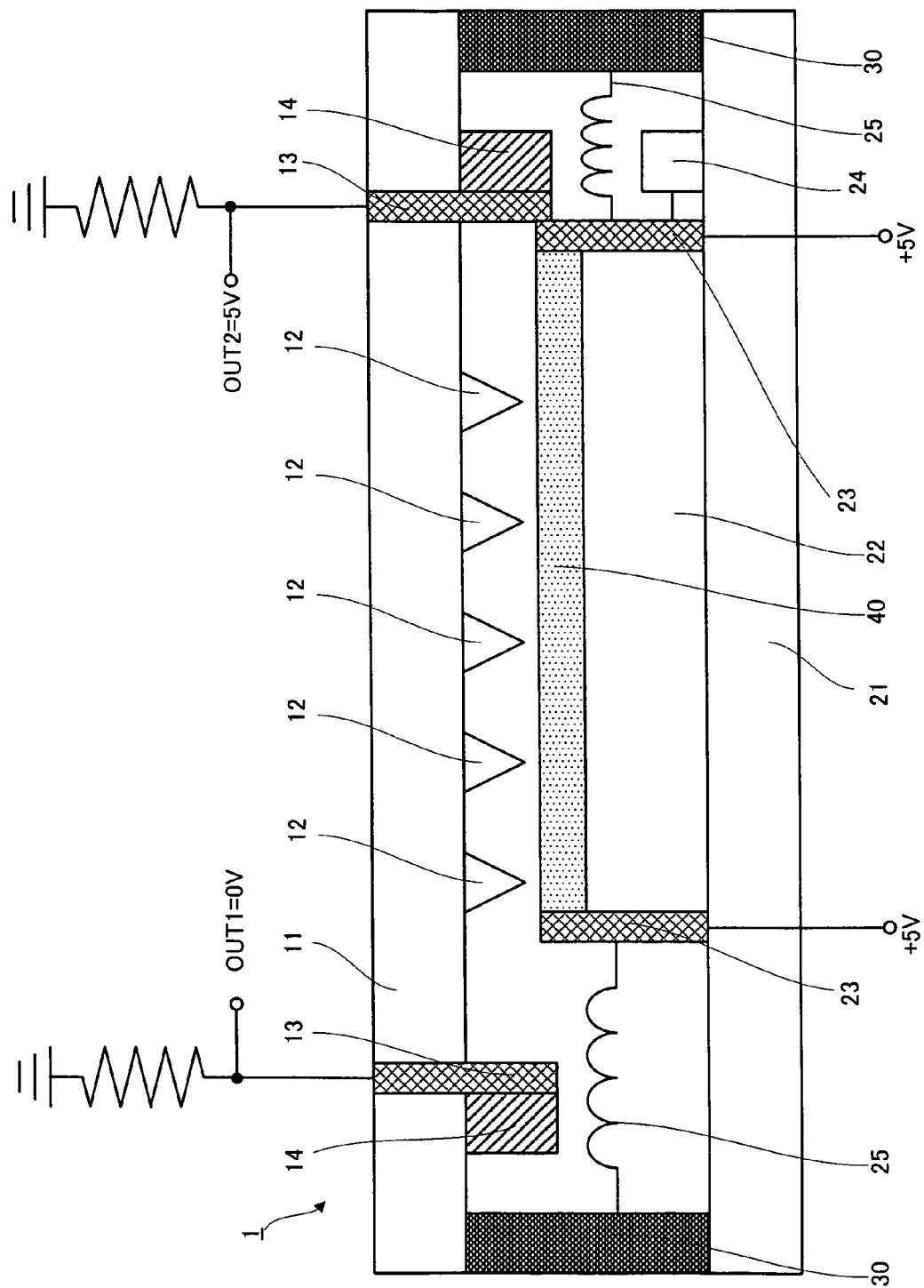

[FIG. 4]
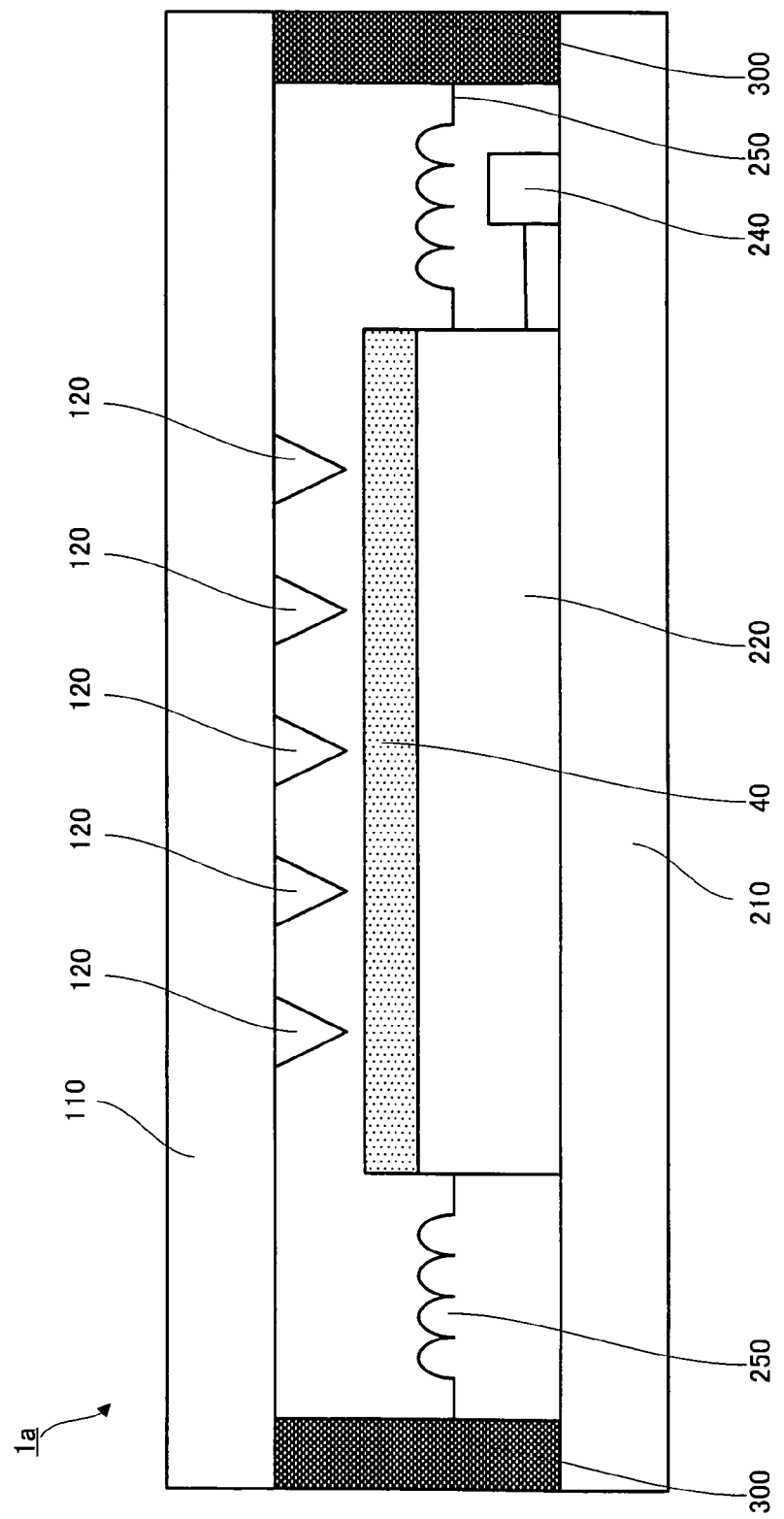

[FIG. 5]
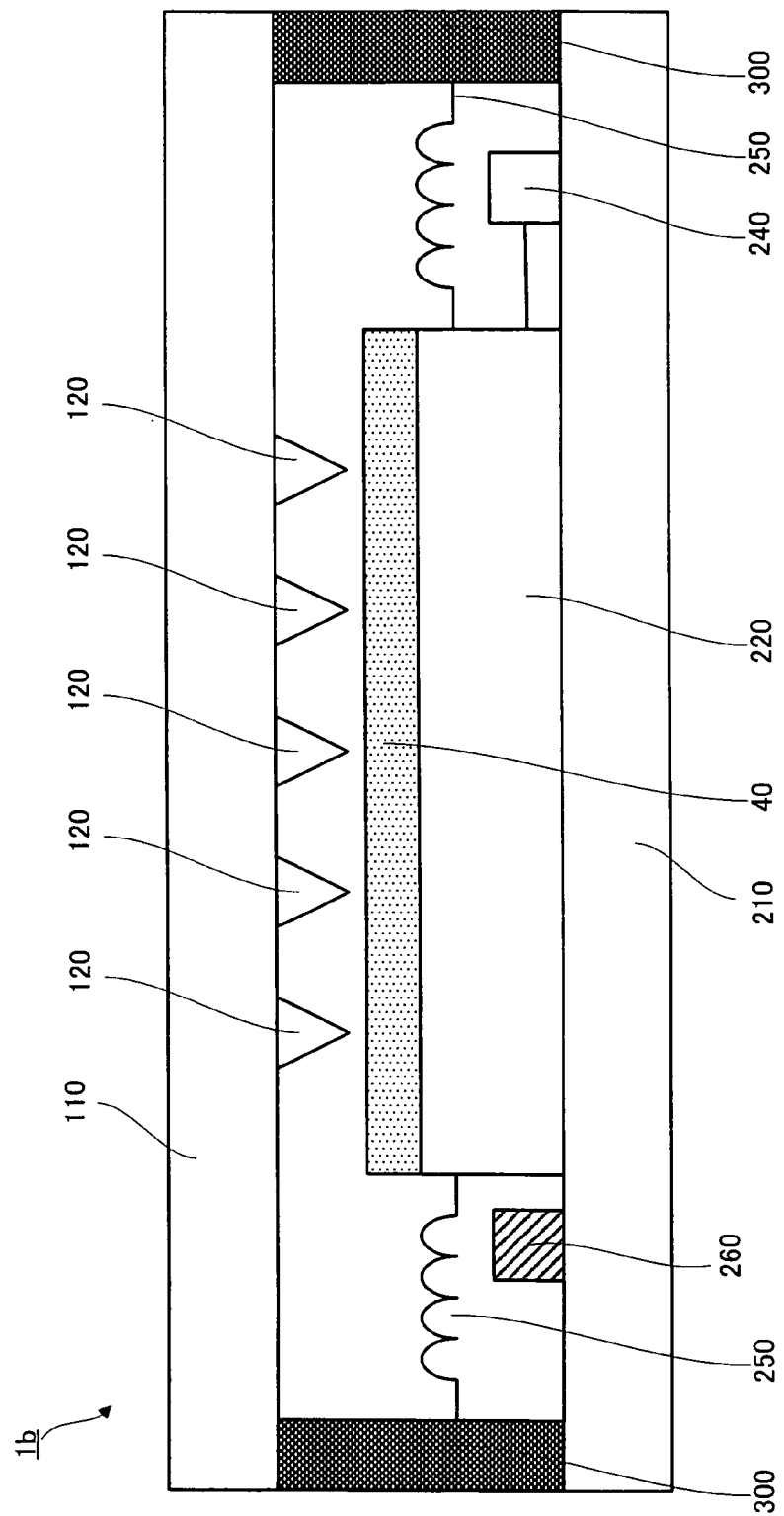

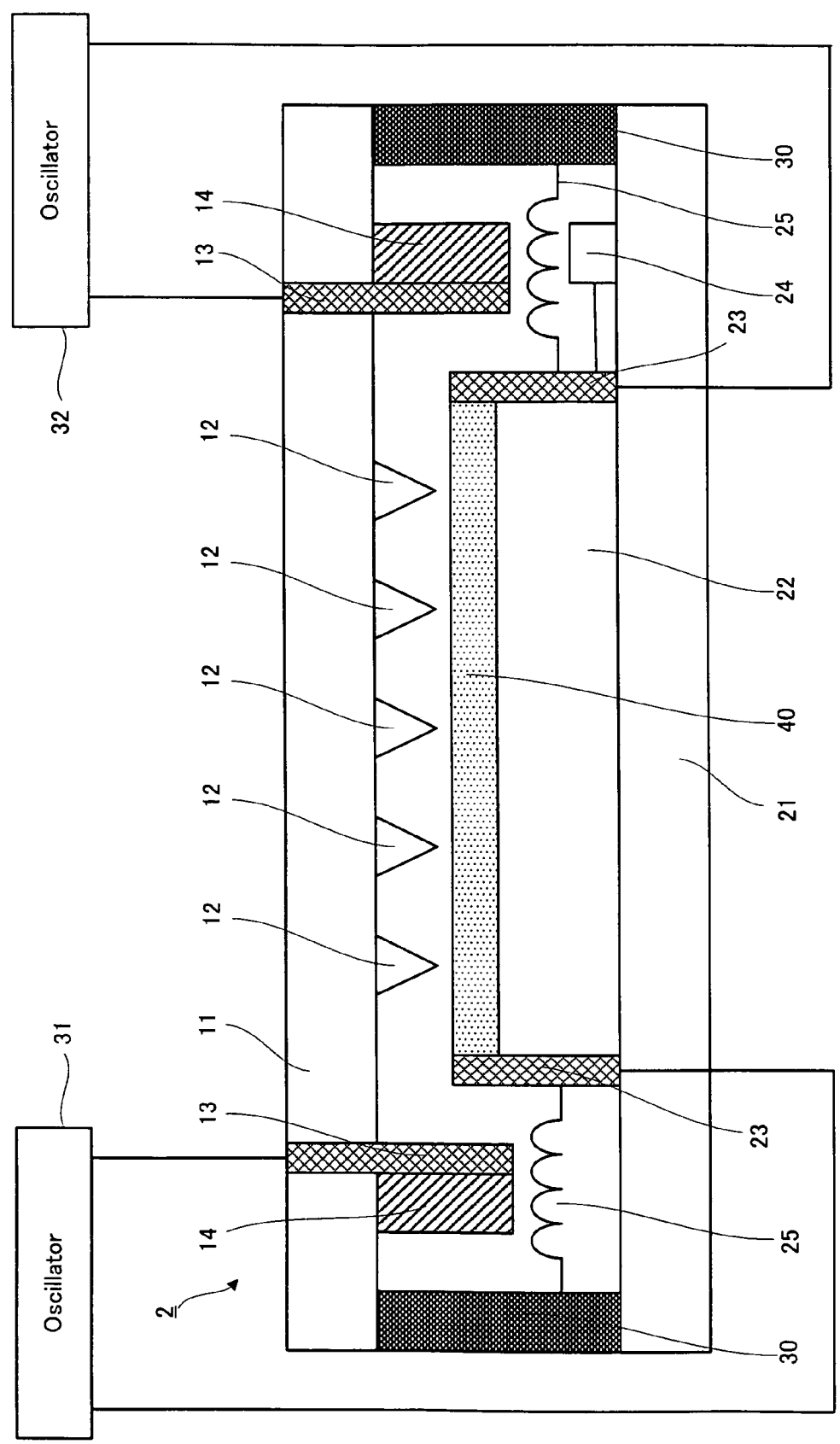
[FIG. 6]

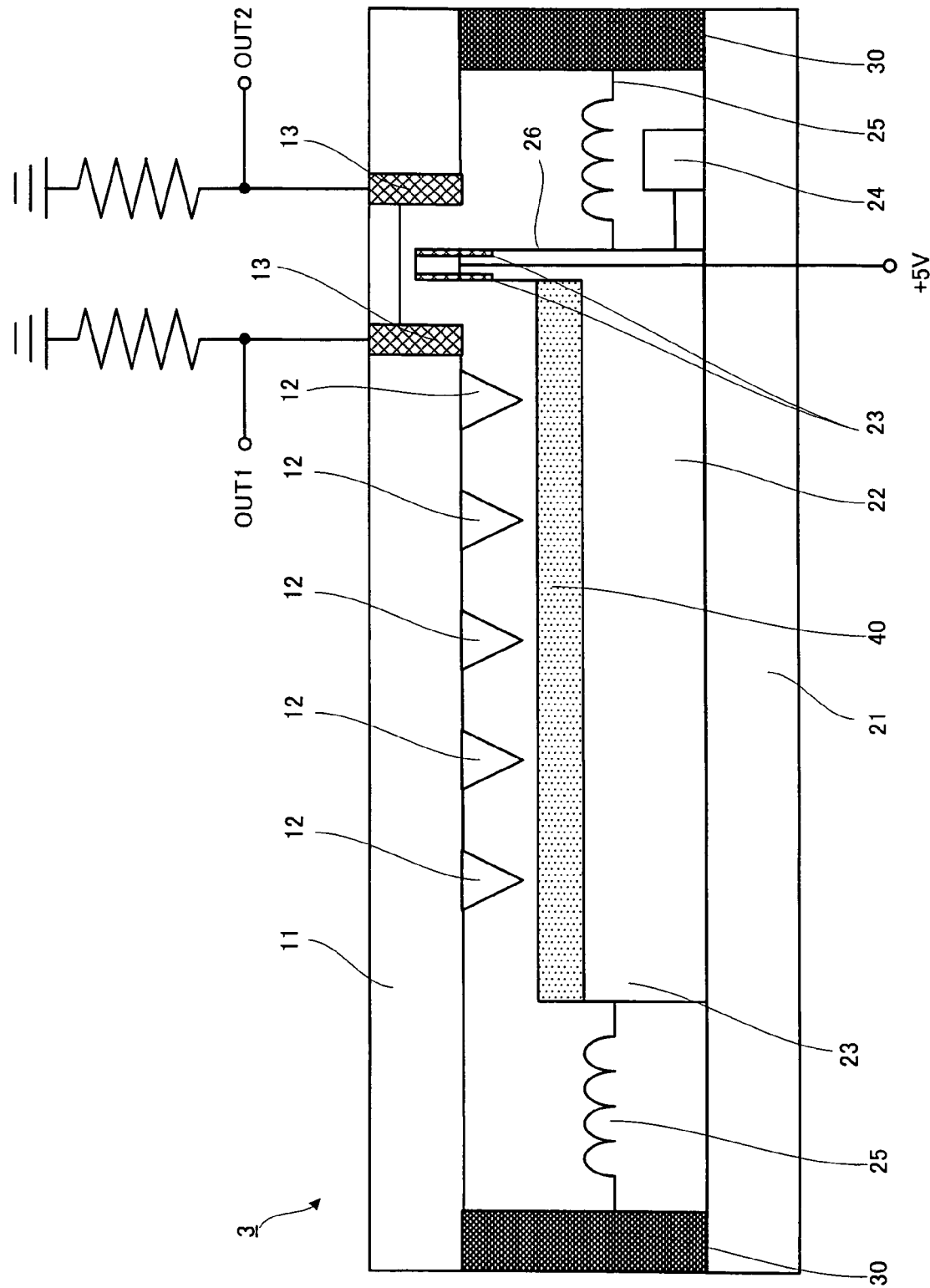
[FIG. 7]

[FIG. 8]
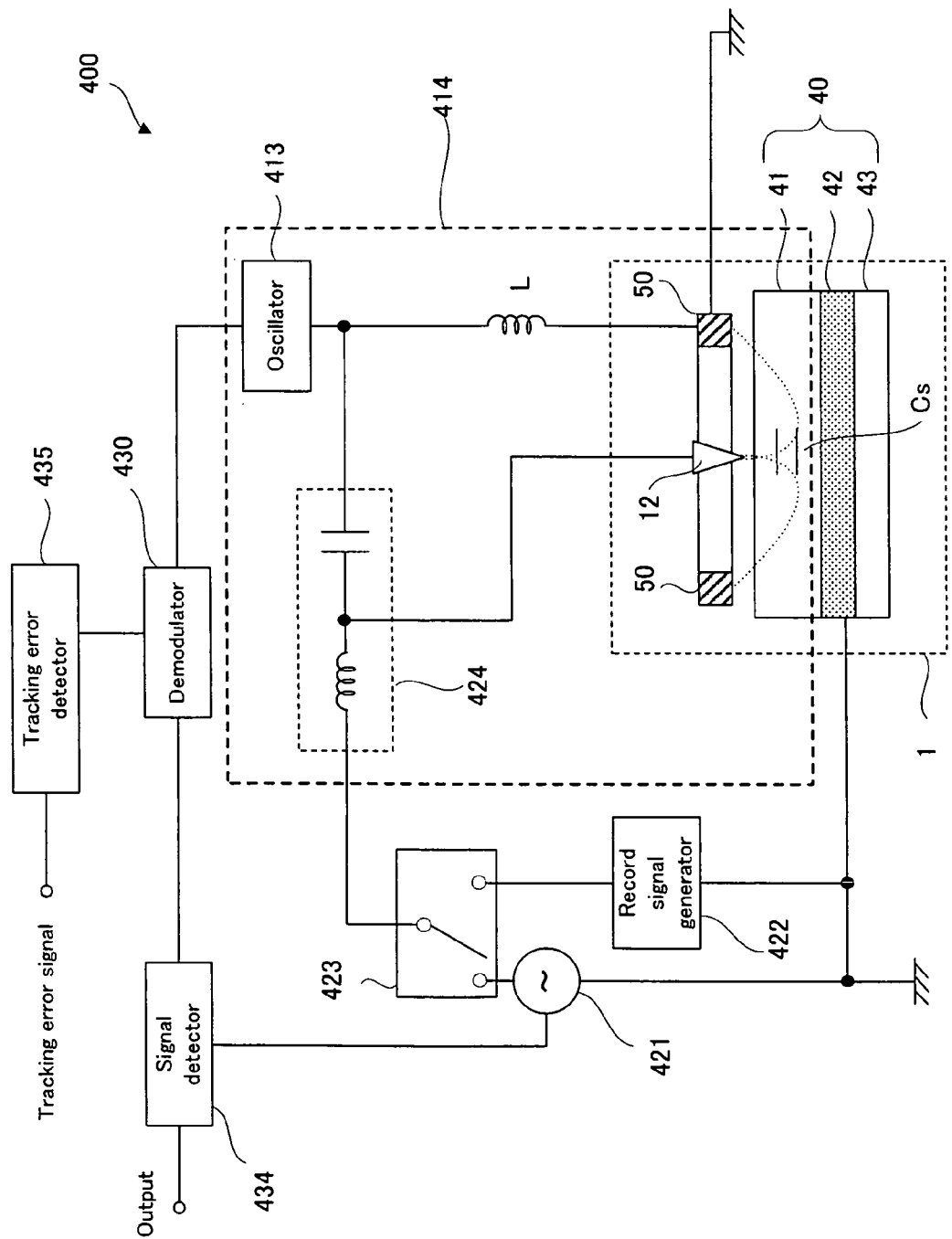

[FIG. 9]
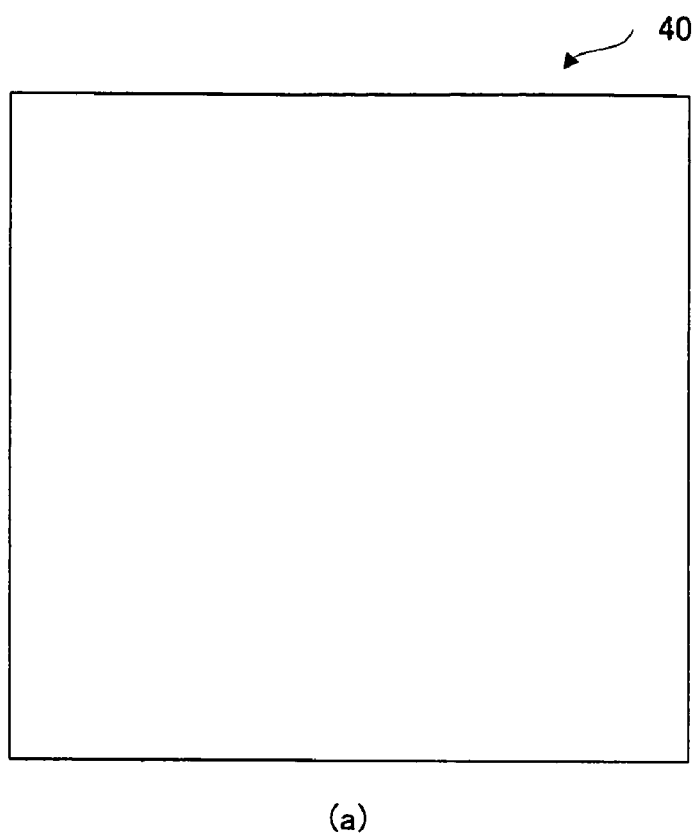
(a)
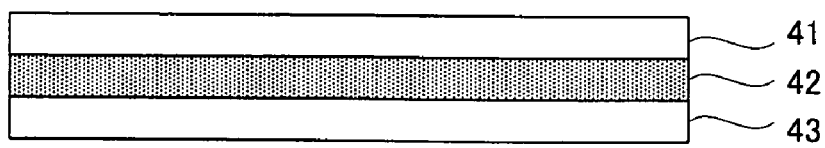
(b)

[FIG. 10]
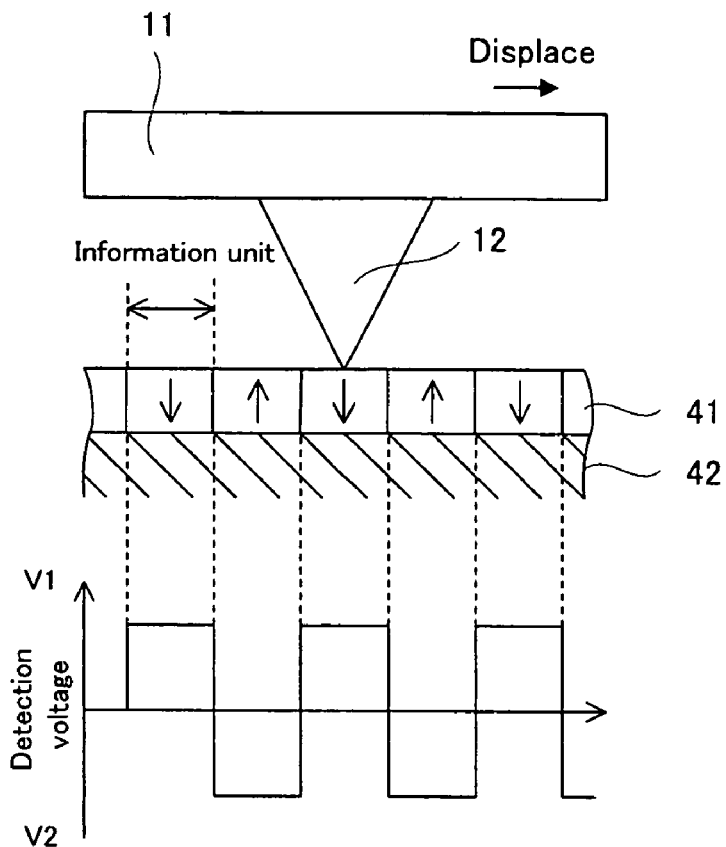
[FIG. 11]
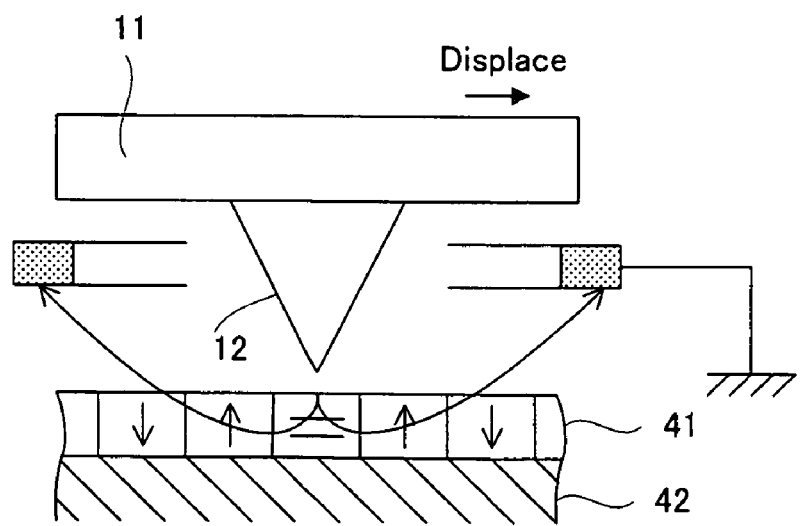

[FIG. 12]
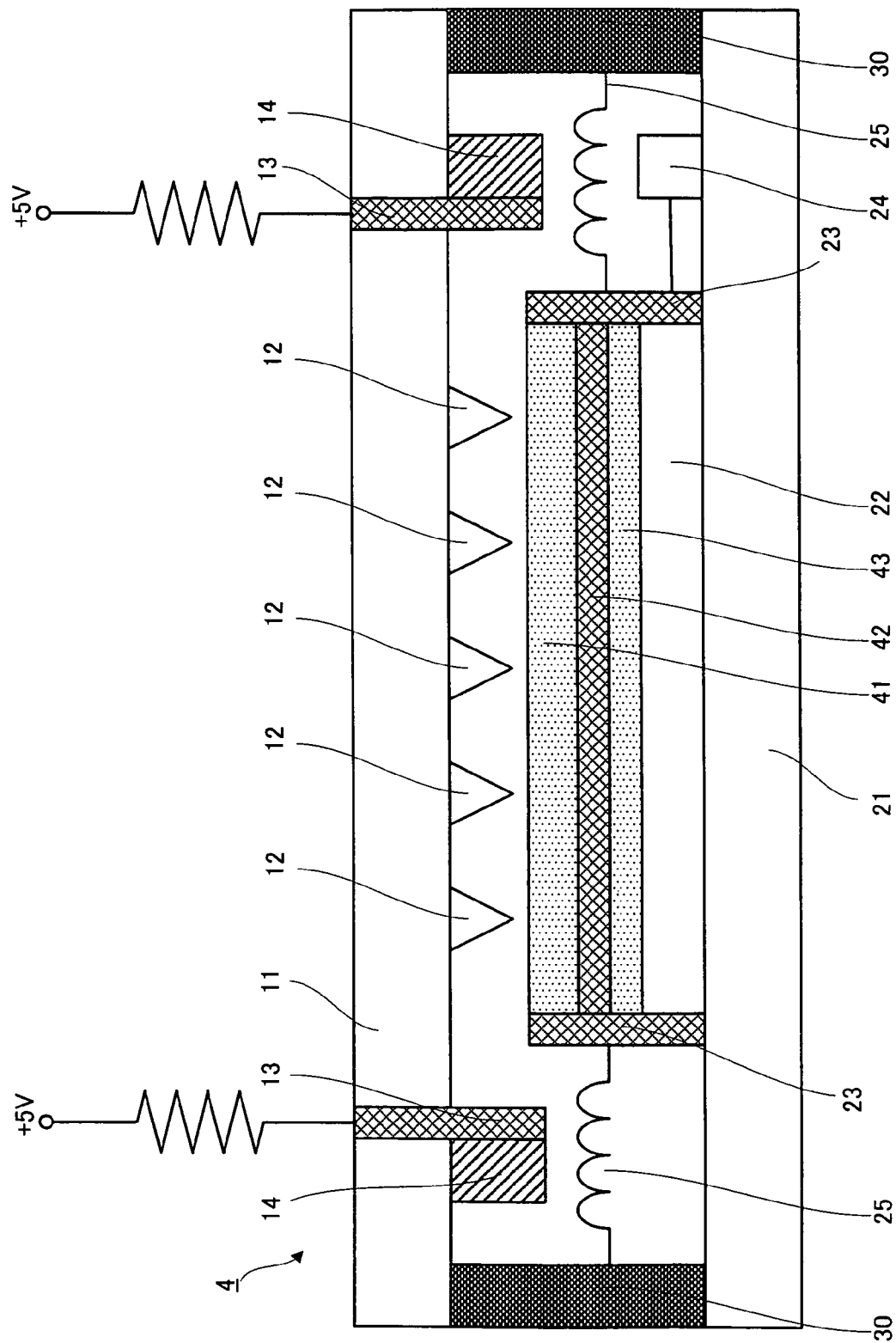

[FIG. 13]
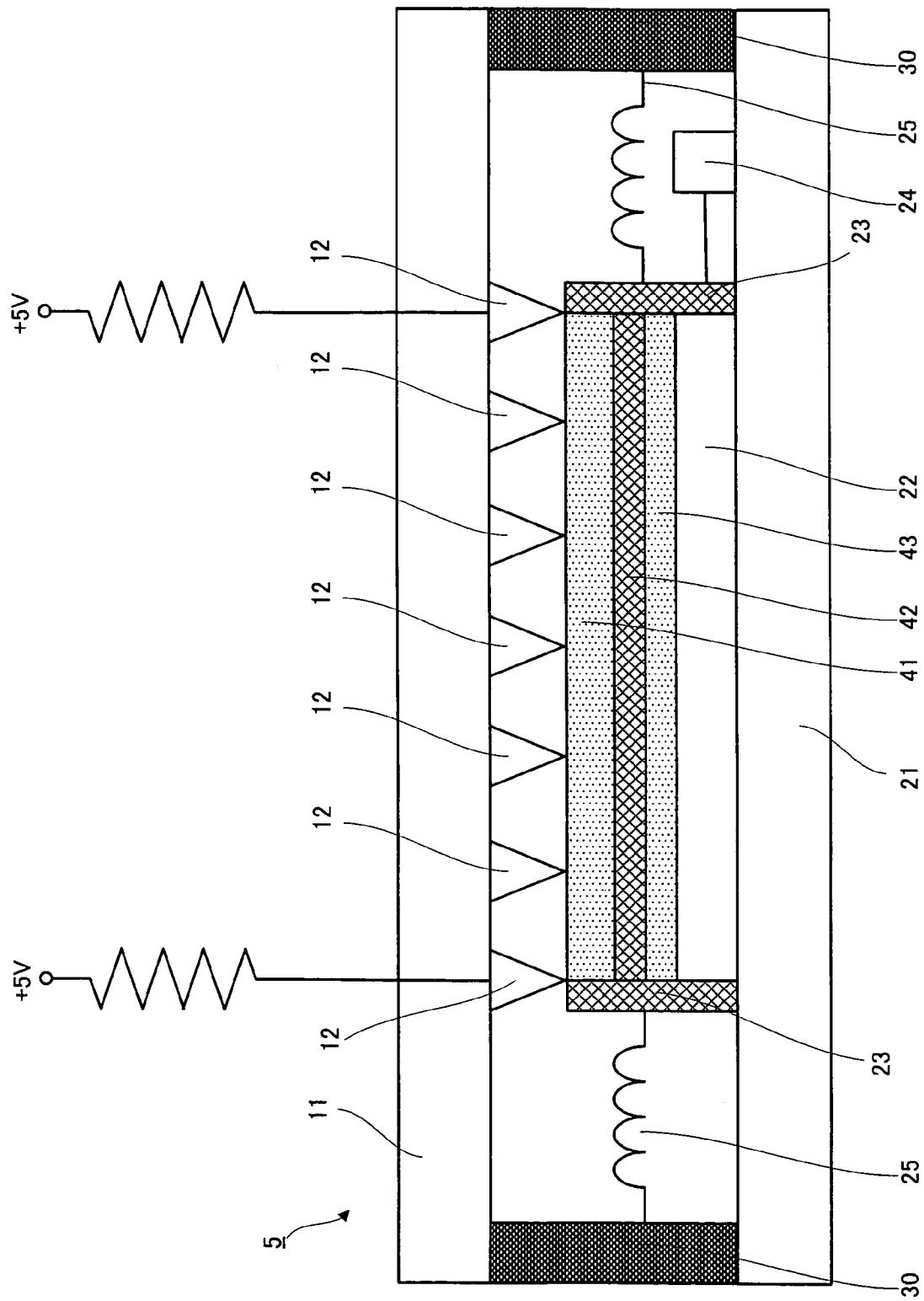

DRIVING APPARATUS

This application is the U.S. national phase of International Application No. PCT/JP2006/314769 filed 26 Jul. 2006 which designated the U.S. and claims priority to JP 2005-215819 filed 26 Jul. 2005, the entire contents of each of which are hereby incorporated by reference.

TECHNICAL FIELD

The present invention relates to a driving apparatus for making a probe scan the surface or the like of a medium while driving the medium or the like in a single-axial direction or a dual-axial direction.

BACKGROUND ART

There has been developed a probe memory for recording data onto a recording medium or reproducing the data recorded on the recording medium with each of a plurality of probes by displacing the recording medium along a recording surface of the recording medium with respect to a probe array including the plurality of probes. In such a probe memory, a position of the probe array with respect to the recording medium (in other words, a positional relationship between the probe array and the recording medium) is detected with e.g. a capacitance type position sensor mounted on a stage, which carries the recording medium. That is, the position of the probe array with respect to the recording medium is detected by detecting the amount of displacement of the recording medium with the position sensor. Then, each of the plurality of probes is displaced to a desired position on the recording medium on the basis of the detected position, to thereby record or reproduce the data. In each of the probes, a scanning limit (scanning range) on the recording medium is determined by a stroke of an actuator for displacing the recording medium.

As described above, in order to detect the position of the probe array with respect to the recording medium by detecting the amount of displacement of the recording medium, it is necessary to record in advance a signal for indicating a reference position on the recording medium. That is, since a position at which the signal for indicating the reference position is detected with the probe is used as an original point in detecting the amount of displacement of the recording medium is by the position sensor and the amount of displacement of the recording medium is detected, it is possible to detect the position of the probe array with respect to the recording medium. One example of a method of controlling a driving stage on the apparatus using the probes described above is disclosed in a patent document 1.

Patent Document 1: Japanese Patent Application Laid Open No. Hei 5-334737

DISCLOSURE OF INVENTION

Subject to be Solved by the Invention

However, if an unexpected impact (unexpected force) is given to the probe array, there is such a technical problem that some of the plurality of probes included in the probe array go off the recording surface of the recording medium and, for example, bump into the side surface of the recording medium. This may cause the probe to be damaged or deformed, so that it is not preferable. In order to avoid such a disadvantage, a possible method is to provide a larger recording surface of the recording medium with respect to the probe array. However, even if the recording surface of the recording medium is set larger, the scanning range of each of the plurality of probes does not change. Thus, the size of an effective area which can be used for the data recording and reproduction does not change. Thus, it is not preferable in terms of effective use of a recording capacity of the recording medium.

Moreover, in order to preferably scan the recording surface of the recording medium with each of the plurality of probes, it is required to perform position adjustment of each of the plurality of probes and the recording medium (moreover, the stage), extremely accurately. However, in order to extremely accurately perform the position adjustment of each of the plurality of probes and the -recording medium (moreover, the stage), for example, highly accurate position adjustment by a sub micron unit is required. Thus, there is such a technical problem that it is hard to certainly ensure the accuracy.

In view of the aforementioned problem, it is therefore an object of the present invention to provide a driving apparatus which enables a recording medium to be displaced while preferably detecting a position of a probe with respect to the recording medium.

Means for Solving the Subject

The above object of the present invention can be achieved by a driving apparatus provided with: a stage structure on which a medium having a small recording domain is mounted; and a facing structure which is provided with at least one small action structure, which faces the medium, for performing a predetermined action to the medium, and which is displaced relatively on a predetermined flat surface with respect to the stage structure, the facing structure provided with a facing-side position detecting unit for detecting a relative reference position of the facing structure with respect to the stage structure, the stage structure provided with a stage-side position detecting unit for detecting a relative reference position of the facing structure with respect to the stage structure.

According to the driving apparatus of the present invention, the medium including a recording medium, a sample, or the like having the size of the centimeter order or less (preferably, on the millimeter order or less, on the sub millimeter order or less, or on the micrometer order or less) is mounted on the stage structure. Then, the facing structure is disposed at the position facing the stage structure, wherein the facing structure is provided with the action structure, such as a probe, which is to perform the predetermined action (e.g. a recording/reproduction operation with respect to the medium described later, an observation operation of observing the surface of the medium or the inside of the medium, or the like) with respect to the medium, for example, by scanning the medium. At this time, the facing structure can be relatively displaced with respect to the stage structure, along the predetermined flat surface (e.g. along the surface of the medium). The "relative displacement" herein means a change in the positional relationship between the facing structure and the stage structure. Specifically, the relative displacement of the facing structure with respect to the stage structure may be realized by that the facing structure is actually displaced and the stage structure is not displaced, by that the stage structure is actually displaced and the facing structure is not displaced, or by that each of the facing structure and the stage structure is actually displaced.

In the present invention, particularly, the facing structure is provided with the facing-side position detecting unit which is used to detect the relative reference position of the facing structure with respect to the stage structure. Moreover, the stage structure is provided with the stage-side position detecting unit which is used to detect the relative reference position of the facing structure with respect to the stage structure. That is, in the present invention, the structure that is used for detecting the reference position of the facing structure with respect to the stage structure is provided for each of the facing structure and the stage structure. Incidentally, the "relative reference position of the facing structure with respect to the stage structure" indicates, for example, a position which is used as a reference when the amount of displacement of the medium described above is detected by a position sensor. For example, by using the "relative reference position of the facing structure with respect to the stage structure" as an original point, the relative amount of displacement of the facing structure with respect to the medium (i.e. with respect to the stage structure) is detected by a position sensor described later. Therefore, by using each of the facing-side position detecting unit and the stage-side position detecting unit, it is possible to detect the relative amount of displacement of the facing structure with respect to the medium (i.e. the stage structure) on the basis of the reference position. As a result, it is possible to displace the facing structure relatively with respect to the stage structure while detecting the relative position of the facing structure with respect to the medium highly accurately.

If, as described in the aforementioned conventional technology, only the position sensor mounted on the stage structure is used, there is a possibility that the accuracy of the relative amount of displacement of the facing structure with respect to the medium is reduced because of a position shift between the facing structure and the stage structure. Thus, it is necessary to extremely correctly perform the position adjustment of the facing structure and the stage structure. In the present invention, however, the structure used to detect the reference position of the facing structure with respect to the stage structure is provided for each of the facing structure and the stage structure. Thus, there is such a great advantage that it is possible to set the reference position highly accurately and it is possible to detect the reference position highly accurately in the actual operation, even if the position adjustment of the facing structure and the stage structure is not so extremely accurately performed. As a result, it is possible to detect the relative position of the facing structure with respect to the medium, highly accurately.

In one aspect of the driving apparatus of the present invention, the stage-side position detecting unit includes a reference surface which crosses the predetermined flat surface at right angles, and the facing-side position detecting unit includes a projection portion which can contact the reference surface along with the relative displacement of the facing structure with respect to the stage structure and which projects with respect to the stage structure.

According to this aspect, it is possible to detect the relative reference position of the facing structure with respect to the stage structure by that the projecting portion as the facing-side position detecting unit bumps into or comes into contact with the reference surface as the stage-side position detecting unit. In other words, the position where the projecting portion contacts the reference surface indicates the relative reference position of the facing structure with respect to the stage structure. Then, if the relative amount of displacement of the facing structure with respect to the medium (i.e. the stage structure) is detected by the aforementioned position sensor with the position where the projecting portion contacts the reference surface being used as the original point, it is possible to detect the relative position of the facing structure with respect to the medium, highly accurately.

Moreover, the projecting portion and the reference surface can act as a mechanical stopper for the relative displacement of the facing structure with respect to the stage structure. Thus, it is possible to preferably prevent a disadvantage, such as damage and deformation, which can be caused by that a probe or the like mounted on the facing structure goes off the medium.

In this aspect, at least one portion of the stage-side position detecting unit may be formed of a same member as a member of the stage structure, and at least one portion of the facing-side position. detecting unit may be formed of a same member as a member of the facing structure. Alternatively, at least one portion of the stage-side position detecting unit may be unified with the stage structure, and at least one portion of the facing-side position detecting unit may be unified with the facing structure.

By virtue of such construction, the facing-side position detecting unit and the stage-side position detecting unit can be formed relatively easily. For example, the facing-side position detecting unit and the stage-side position detecting unit described above can be formed by using a silicon process, such as masking and etching. By this, even an extremely small driving apparatus, such as MEMS (Micro Electro Mechanical System), can preferably have the aforementioned structure. As a result, it is possible to preferably receive the aforementioned benefits.

In another aspect of the driving apparatus of the present invention, the facing-side position detecting unit includes a reference surface which crosses the predetermined flat surface at right angles, and the stage-side position detecting unit includes a projection portion which can contact the reference surface along with the relative displacement of the facing structure with respect to the stage structure and which projects with respect to the facing structure.

According to this aspect, it is possible to receive the same benefits as those in the aforementioned aspect by that the projecting portion as the stage-side position detecting unit bumps into or comes into contact with the reference surface as the facing-side position detecting unit.

In this aspect, at least one portion of the facing-side position detecting unit may be formed of a same member as a member of the facing structure, and at least one portion of the stage-side position detecting unit may be formed of a same member as a member of the stage structure. Alternatively, at least one portion of the facing-side position detecting unit may be unified with the facing structure, and at least one portion of the stage-side position detecting unit may be unified with the stage structure.

By virtue of such construction, the facing-side position detecting unit and the stage-side position detecting unit can be formed relatively easily. For example, the facing-side position detecting unit and the stage-side position detecting unit described above can be formed by using a silicon process, such as masking and etching. By this, even an extremely small driving apparatus, such as MEMS (Micro Electro Mechanical System), can preferably have the aforementioned structure. As a result, it is possible to preferably receive the aforementioned benefits.

In another aspect of the driving apparatus of the present invention, each of the facing-side position detecting unit and the stage-side position detecting unit is provided with a position detecting electrode, and the driving apparatus is further provided with a continuity detecting device for detecting electrical continuity between the position detecting electrode provided for the facing-side position detecting unit and the position detecting electrode provided for the stage-side position detecting unit.

According to this aspect, by detecting the electrical continuity between the position detecting electrode provided for the facing-side position detecting unit and the position detecting electrode provided for the stage-side position detecting unit, it is possible to detect the relative reference position of the facing structure with respect to the stage structure. For example, the position where the electrical continuity between the position detecting electrode provided for the facing-side position detecting unit and the position detecting electrode provided for the stage-side position detecting unit is detected can be used as the relative reference position of the facing structure with respect to the stage structure. Then, if the relative amount of displacement of the facing structure with respect to the medium (i.e. the stage structure) is detected by the aforementioned position sensor by using the position where the electrical continuity between the position detecting electrode provided for the facing-side position detecting unit and the position detecting electrode provided for the stage-side position detecting unit is detected as the original point, it is possible to detect the relative position of the facing structure with respect to the medium, highly accurately.

In another aspect of the driving apparatus of the present invention, each of the facing-side position detecting unit and the stage-side position detecting unit is provided with a position detecting electrode, and the driving apparatus is further provided with a capacitance detecting device for detecting a capacitance between the position detecting electrode provided for the facing-side position detecting unit and the position detecting electrode provided for the stage-side position detecting unit.

According to this aspect, by detecting the capacitance between the position detecting electrode provided for the facing-side position detecting unit and the position detecting electrode provided for the stage-side position detecting unit, it is possible to detect the relative position of the facing structure with respect to the stage structure, in addition to the relative reference position of the facing structure with respect to the stage structure. That is, for example, if the position detecting electrode provided for the facing-side position detecting unit is away from the position detecting electrode provided for the stage-side position detecting unit, these position detecting electrodes can act as a condenser. Therefore, by detecting the extent of the capacitance, it is possible to detect how far the position detecting electrodes are from each other. As a result, it is possible to detect the relative position of the facing structure with respect to the stage structure. On the other hand, if the position detecting electrodes contact each other, the electrical continuity between the position detecting electrodes is detected. Therefore, as in the aspect of the driving apparatus provided with the continuity detecting device, as described above, it is possible to detect the relative reference position of the facing structure with respect to the stage structure.

In another aspect of the driving apparatus of the present invention, the facing structure is provided with a probe for performing at least one of recording of information onto the medium and reproduction of the information recorded on the medium, as the action structure.

According to this aspect, the driving apparatus can be applied to an information recording/reproducing apparatus provided with the probe.

In an aspect of the driving apparatus provided with the probe, as described above, the probe may perform at least one of the recording and the reproduction by applying an electric field to the medium, the medium may be provided with a back electrode, the facing-side position detecting unit may be provided with a position detecting electrode, and the stage-side position detecting unit may be provided with a position detecting electrode which has electrical continuity with the back electrode.

By virtue of such construction, it is possible to detect the reference position of the facing structure with respect to the stage structure while effectively using the structure of the information recording/reproducing apparatus that uses the principle of e.g. SNDM (Scanning Nonlinear Dielectric Microscopy), as described later in detail.

In this construction, the relative reference position of the facing structure with respect to the stage structure may be detected on the basis of a change in a probe signal obtained from the probe.

By virtue of such construction, it is possible to detect the reference position of the facing structure with respect to the stage structure, preferably, on the basis of the change in the probe signal of one or more probes (in other words, an input/output signal or the like) when the probe performs some action to the medium, while effectively using the structure of the information recording/reproducing apparatus that uses the principle of e.g. SNDM (Scanning Nonlinear Dielectric Microscopy).

In this construction, the facing structure may be provided with the position detecting electrode provided for the facing-side position detecting unit, as the probe.

By virtue of such construction, it is possible to detect the reference position of the facing structure with respect to the stage structure while effectively using the structure of the information recording/reproducing apparatus that uses the principle of e.g. SNDM (Scanning Nonlinear Dielectric Microscopy), as described later in detail.

In another aspect of the driving apparatus of the present invention, the facing structure is provided with at least one probe for measuring a property of at least one of a surface of the medium and an inside of the medium, as the action structure.

According to this aspect, the driving apparatus can be applied to various scanning microscopes or the like including e.g. AFM (Atomic Force Microscopy) or the like.

In another aspect of the driving apparatus of the present invention, it is further provided with an amount-of-displacement detecting unit for detecting a relative amount of displacement of the facing structure with respect to the stage structure.

According to this aspect, it is possible to displace the facing structure relatively with respect to the stage structure while detecting the relative position of the facing structure with respect to the medium, highly accurately, by combining the operations of the amount-of-displacement detecting unit including the aforementioned position sensor or the like.

In another aspect of the driving apparatus of the present invention, the facing structure is provided with a probe array including a plurality of probes for performing at least one of recording of information onto the medium and reproduction of the information recorded on the medium, or for measuring a property of at least one of a surface of the medium and an inside of the medium, as the action structure, and at least one of the stage-side position detecting unit and the facing-side position detecting unit is disposed on an outer side of an area occupied by the probe array.

According to this aspect, it is possible to detect the reference position of the facing structure with respect to the stage structure, preferably, without an adverse effect on the action performed to the medium by the probe array including the plurality of probes.

These effects and other advantages of the present invention will become more apparent from the embodiments explained below.

As explained above, the driving apparatus of the present invention is provided with the facing structure and the stage structure, wherein the facing structure is provided with the facing-side position detecting unit and the stage structure is provided with the stage-side position detecting unit. Therefore, for example, the recording medium can be displaced while preferably detecting the position of the probe with respect to the recording medium.

BRIEF DESCRIPTION OF DRAWINGS

FIG. 1 is a cross sectional view schematically showing the basic structure of a driving apparatus in a first embodiment.

FIG. 2 is a cross sectional view conceptually showing one aspect of the operation of the driving apparatus in the first embodiment.

FIG. 3 is a cross sectional view conceptually showing one aspect of the operation of the driving apparatus in the first embodiment.

FIG. 4 is a cross sectional view schematically showing the structure of a driving apparatus in a first comparison example.

FIG. 5 is a cross sectional view schematically showing the structure of a driving apparatus in a second comparison example.

FIG. 6 is a cross sectional view schematically showing the basic structure of a driving apparatus in a second embodiment.

FIG. 7 is a cross sectional view schematically showing the basic structure of a driving apparatus in a third embodiment.

FIG. 8 is a block diagram conceptually showing the basic structure of a dielectric recording/reproducing apparatus in an embodiment.

FIGS. 9 are a plan view and a cross sectional view conceptually showing one example of a recording medium 40 used in the embodiment.

FIG. 10 is a cross sectional view conceptually showing a data recording operation.

FIG. 11 is a cross sectional view conceptually showing a data reproduction operation.

FIG. 12 is a cross sectional view schematically showing the basic structure of a driving apparatus in a first modified example.

FIG. 13 is a cross sectional view schematically showing the basic structure of a driving apparatus in a second modified example.

DESCRIPTION OF REFERENCE CODES 1 driving apparatus
11 upper member
12 probe
13 first electrode
14 projecting portion
21 lower member
22 stage
23 second electrode

BEST MODE FOR CARRYING OUT THE INVENTION

Hereinafter, the best mode for carrying out the invention will be explained in each embodiment in order, with reference to the drawings.

Incidentally, in the following embodiments, the explanation will be given by using the case that the driving apparatus of the present invention is applied to an information recording/reproducing apparatus (specifically, a probe memory).

First Embodiment

Firstly, with reference to FIG. 1 to FIG. 3, a first embodiment of the driving apparatus of the present invention will be explained. FIG. 1 is a cross sectional view schematically showing the basic structure of the driving apparatus in the first embodiment. FIG. 2 is a cross sectional view conceptually showing one aspect of the operation of the driving apparatus in the first embodiment. FIG. 3 is a cross sectional view conceptually showing one aspect of the operation of the driving apparatus in the first embodiment.

As shown in FIG. 1, a driving apparatus 1 in the first embodiment is provided with: an upper member 11; a plurality of probes 12; first electrodes 13; projecting portions (rib) 14; a lower member 21; a stage 22; second electrodes 23; a position sensor 24; actuators 25; side walls 30; and a recording medium 40.

The upper member 11 is a fixed support member to support the plurality of probes 12 arranged on a matrix of 8×8 or 64×64.

Each of the plurality of probes 12 constitutes one specific example of the "action structure" of the present invention, and it has a size on micrometer order or nanometer order. Moreover, each of the plurality of probes 12 has a small, almost spherical or projecting tip with a radius of about 10 nanometers to 25 nanometers (i.e. on the nanometer order), and it applies a predetermined electric field to the recording medium 40. The tip of each of the probes 12 may contact a recording surface of the recording medium 40. Alternatively, the tip of each of the probes 12 may be close to the recording surface of the recording medium to the extent that it can be regarded as the contact. By applying the electric field to the recording medium 40 from each of the probes 12, it is possible to record data onto the recording medium 40 or reproduce the data recorded on the recording medium 40. The details of the recording operation and the reproduction operation will be detailed later (refer to FIG. 8 to FIG. 11).

Incidentally, the upper member 11 and the plurality of probes 12 constitute a probe array, and at the same time, they constitute one specific example of the "facing structure" of the present invention.

The first electrode 13 constitutes one specific example of the "facing-side position detecting unit" or the "position detecting electrode" of the present invention, and it is formed on the surface of the projecting portion 14. In particular, the first electrode 13 is formed at a position where it can contact the second electrode 23 along with the displacement of the stage 22. Moreover, the first electrode 13 is earthed through a predetermined resistance, and the end portion of the resistance is provided with an output terminal OUT1 or OUT2.

The projecting portion 14 constitutes one specific example of the "facing-side position detecting unit" of the present invention. The projecting portion 14 indicates the limit of a range where the recording medium 40 can be displaced, and it acts as a stopper which physically prevents the displacement of the recording medium 40. The projecting portion 14 is disposed at such a position that it can contact the side surface of the recording medium 40 or the stage 22 through the first electrode 13 and the second electrode 23 along with the displacement of the stage 22. The projecting portion 14 is disposed in such a shape that it can contact the side surface of the recording medium 40 or the stage 22.

The lower member 21 is a fixed support member to support the position sensor 22 or the like.

The stage 22 constitutes one specific example of the "stage structure" of the present invention, and the recording medium 40 is mounted on the upper surface of the stage 22. The stage 22 is adapted to be displaced along the surface of the stage 22 (i.e. along the recording surface of the recording medium 40) by the operation of the actuators 25. Incidentally, for simplification of explanation, an example in which the stage 22 is displaced in a horizontal direction in FIG. 1 will be explained below; however, the stage 22 maybe displaced in an arbitrary direction if it is along the recording surface of the recording medium 40. That is, the stage 22 in the first embodiment corresponds to the stage that allows dual-axial driving in an x direction and a y direction.

The second electrode 23 constitutes one specific example of the "stage-side position detecting unit" or the "position detecting electrode" of the present invention, and it is formed along the side surface of the stage 22 (in other words, the side surface of the recording medium 40). In particular, the second electrode 23 is formed at such a position that it can contact the first electrode 13 along with the displacement of the stage 22. Moreover, a voltage of "+5V" is applied to the second electrode 23.

Incidentally, if the data is recorded or reproduced by applying the electric filed to the recording medium 40, the second electrode 23 and the recording medium 40 (in particular, its recording surface) are preferably insulated. As detailed later, however, the second electrode 23 and one portion of the recording medium 40 may have electrical continuity.

The position sensor 24 constitutes one specific example of the "amount-of-displacement detecting unit" of the present invention, and it is adapted to detect the amount of displacement of the stage 22. For example, the position sensor 24 is adapted to detect the amount of displacement in the x direction of the stage 22 and the amount of displacement in the y direction. The position sensor 24 may be, for example, a capacitance type position sensor, or a position sensor using another method.

The actuators 25 displace the stage 22 along the surface of the stage 22 (along the recording surface of the recording medium 40). The actuator 25 may include an elastic member including a spring or the like as shown in FIG. 1. Alternatively, the actuators 25 may displace the stage 22 by using an electric action, a mechanical action, or a magnetic action. In short, the specific structure of the actuator 25 is not limited as long as the actuator 25 can displace the stage 22.

Incidentally, the aforementioned first electrode 13 may be formed to be a series of the upper member 11 (in other words, the aforementioned first electrode 13 and the upper member 11 may be formed as one unified structure). Alternatively, the aforementioned second electrode 14 may be formed to be a series of the stage 22. Alternatively, the aforementioned projecting portion 14 may be formed of the same member as the member of the upper member 11 to be series of the upper member 11. In this case, these constituent elements can be formed relatively easily by using a silicon process, such as masking and etching. Of course, it is obvious that the constituent elements may be formed by using another process.

Moreover, the first electrode 13 and the projecting portion 14 are preferably formed on the outer side of an area on the upper member 11 at which each of the probes 12 is formed. In the same manner, the side surface of the stage 22 and the second electrode 23 are preferably formed on the outer side of an area on the upper member 11 at which each of the probes 12 is formed.

Next, with reference to FIG. 2 and FIG. 3, an aspect of the operation of the driving apparatus 1 in the first embodiment will be explained. The driving apparatus 1 in the first embodiment detects and sets a reference position, which is an original point when the amount of displacement is detected, before detecting the amount of displacement of the stage 22 by using the position sensor 24.

Specifically, as shown in FIG. 2 and FIG. 3, the stage 22 is displaced by the operation of the actuators 25 until the side surface of the stage 22 comes into contact with the projecting portion 14, wherein the side surface of the stage 22 constitutes one specific example of the "reference surface" of the present invention. A position where the projecting portion 14 contacts the stage 22 is set as the reference position which is used when the position sensor 24 detects the amount of displacement of the stage (or the recording medium 40). In other words, if the stage 22 is displaced in the x direction or the y direction and if the side surface of the stage 22 comes into contact with the projecting portion 14, the driving apparatus 1 detects and sets the position of the stage 22 at that time, as the reference position of the stage 22 (i.e. the original point which is used when the position sensor 24 detects the amount of displacement of the stage 22).

The contact between the side surface of the stage 22 and the projecting portion 14 can be detected relatively easily, by monitoring the output terminal OUT1 or OUT2 connected to the first electrode 13.

Specifically, as shown in FIG. 2, if the projecting portion 14 on the left side contacts the side surface on the left side of the stage 22, the first electrode 13 formed on the side surface of the projecting portion 14 on the left side (hereinafter referred to as a "left-side first electrode 13", as occasion demands) contacts the second electrode 23 formed on the side surface on the left side of the stage 22 (hereinafter referred to as a "left-side second electrode 23", as occasion demands). Therefore, a voltage of "+5V" is applied to the left-side first electrode 13 through the left-side second electrode 23. As a result, the terminal voltage of the output terminal OUT1 is "+5V". At this time, since the projecting portion 14 on the right side does not contact the side surface on the right side of the stage 22, the first electrode 13 formed on the side surface of the projecting portion 14 on the right side (hereinafter referred to as a "right-side first electrode 13", as occasion demands) does not contact the second electrode 23 formed on the side surface on the right side of the stage 22 (hereinafter referred to as a "right-side second electrode 23", as occasion demands). Therefore, the terminal voltage of the output terminal OUT2 connected to the right-side first electrode 13 is "0V". Therefore, if the terminal voltage of the output terminal OUT1 is "+5V" and the terminal voltage of the output terminal OUT2 is "0V", the driving apparatus 1 can recognize that the stage 22 contacts the projecting portion 14 on the left side.

Alternatively, as shown in FIG. 3, if the projecting portion 14 on the right side contacts the side surface on the right side of the stage 22, the right-side first electrode 13 contacts the right-side second electrode 23. Therefore, a voltage of "+5V" is applied to the right-side first electrode 13 through the right-side second electrode 23. As a result, the terminal voltage of the output terminal OUT2 is "+5V". At this time, since the projecting portion 14 on the left side does not contact the side surface on the left side of the stage 22, the left-side first electrode 13 does not contact the left-side second electrode 23. Therefore, the terminal voltage of the output terminal OUT1 connected to the left-side first electrode 13 is "0V". Therefore, if the terminal voltage of the output terminal OUT2 is "+5V" and the terminal voltage of the output terminal OUT1 is "0V", the driving apparatus 1 can recognize that the stage 22 contacts the projecting portion 14 on the right side.

Moreover, if the stage 22 does not contact each of the projecting portion 14 on the left side and the projecting portion 14 on the right side, then the right-side first electrode 13 does not contact the right-side second electrode 23, and moreover the left-side first electrode 13 does not contact the left-side second electrode 23. Thus, the terminal voltages of the output terminals OUT1 and OUT2 are both "0V". Therefore, if the terminal voltages of the output terminals OUT1 and OUT2 are both "0V", the driving apparatus 1 can recognize that the stage 22 does not contact any of the projecting portions 14 (i.e. that the stage 22 is not displaced up to the reference position).

As described above, after setting the position where the projecting portion 14 contacts the side surface of the stage 22 as an absolute reference position (original point) which is used when the amount of displacement of the stage 22 is detected, the position sensor 24 detects how far the stage 22 is displaced from the reference position. By this, the driving apparatus 1 can preferably recognize the accurate positions of the plurality of probes to the recording medium 40.

Now, with reference to FIG. 4 and FIG. 5, comparison examples of the driving apparatus in the first embodiment will be explained. FIG. 4 is a cross sectional view schematically showing the structure of a driving apparatus in a first comparison example. FIG. 5 is a cross sectional view schematically showing the structure of a driving apparatus in a second comparison example.

As shown in FIG. 4, a driving apparatus 1a in the first comparison example is provided with: an upper member 110; a plurality of probes 120; a lower member 210; a stage 220; a position sensor 240; actuators 250; side walls 300; and a recording medium 40. The driving apparatus 1a in the first comparison having such a structure can merely detect the amount of displacement of the stage 220 by the position sensor 240. Thus, it is necessary to record a position signal, which indicates the reference position, on the recording medium 40 in advance. If the position signal, which indicates the reference position, is not recorded on the recording medium 40, it is necessary to extremely strictly adjust the position of each of the upper member 110 provided with the plurality of probes 120 and the lower member 210 provided with the stage 220 or the like when the driving apparatus 1a is produced.

Alternatively, even in a driving apparatus 1b in the second comparison which is further provided with a stopper 260, as shown in FIG. 5, if the stopper 260 is disposed on the lower member 210, it is necessary to extremely strictly adjust the position of each of the upper member 110 provided with the plurality of probes 120 and the lower member 210 provided with the stage 220 or the like when the driving apparatus 1b is produced.

In the first embodiment, however, the projecting portion 14 for detecting and setting the reference position is disposed on the upper member 11 provided with the plurality of probes 12. Thus, even if the position of each of the upper member 11 and the lower member 21 is not extremely strictly adjusted (in other words, regardless of a position shift between the upper member 11 and the lower member 21), the projecting portion 14 has a fixed positional relationship with the plurality of probes 12. Then, with regard to the amount of displacement of the stage 22, the position where the side surface of the stage 22 contacts the projecting portion 14 is the reference position (original point). Thus, the position sensor 24 can detect how far the recording medium 40 can be displaced from the position of the projecting portion 14 of the upper member 11 without a significant influence of the position shift between the upper member 11 and the lower member 21. In other words, the position sensor 24 can detect how far the recording medium 40 is displaced with respect to the plurality of probes 12, highly accurately. Therefore, since the recording medium 40 can be displaced highly accurately, it is possible to apply the electric fields from the plurality of probes 12 to desired positions on the recording medium 40. As a result, the recording operation or the reproduction operation can be preferably performed.

As described above, in the first embodiment, the extremely strict position adjustment between the upper member 11 and the lower member 21 is not required, so that the driving apparatus 1 can be constructed, relatively easily. This also leads to a reduction in cost of the driving apparatus 1. Moreover, although the strict position adjustment is not required, there is also such an advantage that the positions of the probes 12 with respect to the recording medium 40 can be detected highly accurately.

In addition, the projecting portion 14 also has a function as the physical stopper for defining the limit of the displacement with respect to the stage 22. Therefore, it is possible to preferably prevent such a disadvantage that the stage 22 is displaced unexpectedly excessively. Thus, it is possible to prevent such a disadvantage that the probes 12 go off the recording surface 40 and, for example, bump into the side surface of the recording medium 40 to thereby cause the probe to be damaged or deformed. In addition, it is no longer necessary to increase the recording surface of the recording medium 40 unnecessarily, compared to the range that the probes 12 are disposed. Thus, it is possible to use the recording capacity of the recording medium 40, maximally effectively.

Incidentally, the position of the projecting portion 14 is the reference position which is used when the amount of displacement of the stage 22 is detected. Thus, in view of the arrangement and the arrangement interval of the probes 12 and the initial position or the like of the stage 22, the projecting portion 14 is preferably displaced at a preferable position of the upper member 11. At that time, the projecting portion 14 may be unified with the upper member 11, or may be separately formed. If the projecting portion 14 is formed separately, a pin, a member or the like in a predetermined shape may be mounted on the upper member 11 as the projecting portion 14. Moreover, in order to make the side surface of the stage 22 preferably contact the projecting portion 14, the side surface of the stage 22 and the side surface of the projecting portion 14 are preferably almost perpendicular to the displacement direction of the stage 22.

However, as long as the projecting portion 14 can come in contact with the stage 22 along with the displacement of the stage 22 and the contact allows the reference position to be detected and set, it is obvious that various structures, such as a shape and displacement, of the projecting portion 14 can employ arbitrary structures. Similarly, the structural portion of the stage 22 which contacts the projecting portion 14 disposed on the upper member 11 is not necessarily the side surface of the stage 22. As long as the structural portion can come in contact with the projecting portion 14 and the contact allows the reference position to be detected and set, the structural portion of the stage 22 which contacts the projecting portion 14 can employ an arbitrary structure. Similarly, the first electrode 13 and the second electrode 14 also can employ arbitrary structures.

Moreover, it may be also constructed such that the first electrode 13 and the second electrode 23 are not provided. In this case, if the side surface of the stage 22 contacts the projecting portion 14, the actuator 25 cannot displace the stage 22 anymore. If the position where the actuator 25 cannot displace the stage 22 anymore is detected, for example, by monitoring the operation or the like of the actuator 25, the same operation as the aforementioned operation can be performed.

Moreover, in the aforementioned first embodiment, the positions of the plurality of probes 12 are fixed, and the stage 22 is displaced with respect to the plurality of probes 12; however, the position of the stage 22 may be fixed and the plurality of probes 12 may be displaced with respect to the stage 22. Alternatively, the stage 22 is displaced with respect to the plurality of probes 12 and simultaneously the plurality of probes 12 may be displaced with respect to the stage 22.

Moreover, in the aforementioned first embodiment, the driving apparatus, which is used for an information recording/reproducing apparatus for recording the data onto the recording medium mounted on the stage 22 or reproducing the data recorded on the recording medium 40 by applying the electric field from each of the probes 12, is explained. However, the aforementioned driving apparatus 1 can be used for an information recording/reproducing apparatus for recording the data onto the recording medium or reproducing the data recorded on the recording medium by using another method (e.g. various information recording/reproducing apparatuses or the like in which the recording medium is mounted on the stage that can be displaced relatively to the probes). Alternatively, the aforementioned driving apparatus 1 may be used not only for the information recording/reproducing apparatus but also equipment for measuring the surface structure, inner structure, various properties or the like of a sample mounted on the stage (e.g. various scanning microscopes or the like in which a sample to be observed is mounted on the stage that can be displaced relatively to an observing device). In short, any equipment that is provided with the stage 22 that can be displaced relatively to the upper member 11 can receive the various benefits described above, by using the aforementioned driving apparatus 1.

Second Embodiment

Next, with reference to FIG. 6, a driving apparatus in a second embodiment will be explained. FIG. 6 is a cross sectional view schematically showing the basic structure of the driving apparatus in the second embodiment. Incidentally, the same structure as that of the driving apparatus 1 in the first embodiment described above carries the same numerical reference, and the detailed explanation thereof will be omitted. That is, here, a detailed explanation will be given on the structure unique to the driving apparatus in the second embodiment.

As shown in FIG. 6, a driving apparatus 2 in the second embodiment is provided with: an upper member 11; a plurality of probes 12; first electrodes 13; projecting portions (rib) 14; a lower member 21; a stage 22; second electrodes 23; a position sensor 24; actuators 25; side walls 30; and a recording medium 40, as in the driving apparatus 1 in the first embodiment.

Particularly, the driving apparatus 2 in the second embodiment is provided with oscillators 31 and 32, which constitute one specific example of the "capacitance detecting device" of the present invention. In the oscillator 31, an oscillation frequency changes in accordance with a capacitance between the left-side first electrode 13 and the left-side second electrode 23. In the oscillator 32, an oscillation frequency changes in accordance with a capacitance between the right-side first electrode 13 and the right-side second electrode 23.

An aspect of the operation of the driving apparatus 2 in the second embodiment having such a structure will be explained. In FIG. 6, if the stage 22 is displaced from the right side to the left side, the interval between the left-side first electrode 13 and the left-side second electrode 23 becomes narrower, and the interval between the right-side first electrode 13 and the right-side second electrode 23 becomes wider. Along with that, the capacitance between the left-side first electrode 13 and the left-side second electrode 23 increases, and thus the oscillation frequency of the oscillator 31 reduces. Moreover, the capacitance between the right-side first electrode 13 and the right-side second electrode 23 reduces, and thus the oscillation frequency of the oscillator 32 increases.

On the other hand, in FIG. 6, if the stage 22 is displaced from the left side to the right side, the interval between the left-side first electrode 13 and the left-side second electrode 23 becomes wider, and the interval between the right-side first electrode 13 and the right-side second electrode 23 becomes narrower. Along with that, the capacitance between the left-side first electrode 13 and the left-side second electrode 23 reduces, and thus the oscillation frequency of the oscillator 31 increases. Moreover, the capacitance between the right-side first electrode 13 and the right-side second electrode 23 increases, and thus the oscillation frequency of the oscillator 32 reduces.

On the other hand, in FIG. 6, if the left-side first electrode 13 comes in contact with the left-side second electrode 23 (i.e. the projecting portion 14 on the left side comes in contact with the side surface on the left side of the stage 22) by displacing the stage 22 from the right side to the left side, the oscillation of the oscillator 31 stops. Therefore, the position where the oscillation of the oscillator 31 stops can be set as the reference position which is used when the position sensor 24 detects the amount of displacement of the stage 22.

On the other hand, in FIG. 6, if the right-side first electrode 13 comes in contact with the right-side second electrode 23 (i.e. the projecting portion 14 on the right side comes in contact with the side surface on the right side of the stage 22) by displacing the stage 22 from the left side to the right side, the oscillation of the oscillator 32 stops. Therefore, the position where the oscillation of the oscillator 32 stops can be set as the reference position which is used when the position sensor 24 detects the amount of displacement of the stage 22.

As described above, by monitoring the oscillation of the oscillator 31 or 32, the driving apparatus 2 can recognize that the side surface of the stage 22 comes in contact with the projecting portion 14, and thus it can preferably set the reference position. Therefore, the driving apparatus 2 in the second embodiment can receive the aforementioned various benefits.

Moreover, by monitoring the oscillation frequency of the oscillator 31 or 32, it is possible to recognize how far the first electrode 13 is away from the second electrode 23 (i.e. how far the projecting portion 14 is away from the stage 22). Therefore, the amount of displacement of the stage 22 can be detected by using the first electrode 13, the second electrode 23, and the oscillators 31 and 32, instead of the position sensor 24. In this case, the position sensor 24 may not be provided, separately and independently.

Incidentally, it is obvious that the various structures in the first embodiment described above can be combined. Moreover, even if they are combined as described above, it is possible to receive the aforementioned various benefits. Thus, that is obviously included in the scope of the present invention.

Third Embodiment

Next, with reference to FIG. 7, a driving apparatus in a third embodiment will be explained. FIG. 7 is a cross sectional view schematically showing the basic structure of the driving apparatus in the third embodiment. Incidentally, the same structure as that of the driving apparatus 1 in the first embodiment or the driving apparatus 2 in the second embodiment described above carries the same numerical reference, and the detailed explanation thereof will be omitted. That is, here, a detailed explanation will be given on the structure unique to the driving apparatus in the third embodiment.

As shown in FIG. 7, a driving apparatus 3 in the third embodiment is provided with: an upper member 11; a plurality of probes 12; first electrodes 13; projecting portions (rib) 14; a lower member 21; a stage 22; second electrodes 23; a position sensor 24; actuators 25; side walls 30; and a recording medium 40, as in the driving apparatus 1 in the first embodiment.

Particularly, in the driving apparatus 3 in the third embodiment the stage 22 is provided with a projecting portion (rib) 26. That is, in the driving apparatus 3 in the third embodiment, the projecting portion 26, which projects from the stage 22 side to the upper member 11, is provided. In this case, the upper member 11 is partially depressed in accordance with the shape of the projecting portion 26, and the side surface of the depression constitutes one specific example of the "reference surface" of the present invention.

Even the driving apparatus 3 in the third embodiment having such a structure can receive the aforementioned various benefits. That is, regardless of which of the upper member 11 and the stage 22 is provided with the projecting portion 14 (26), the aforementioned various benefits can be received, as long as the structure for detecting and setting the reference position which is used when the amount of displacement of the stage 22 is detected is formed on both the upper member 11 on which the plurality of probes 12 are disposed and the stage 22 which carries the recording medium 40.

Incidentally, it is obvious that the various structures of the first embodiment and the second embodiment described above may be combined. Moreover, even if they are combined as described above, it is possible to receive the aforementioned various benefits. Thus, that is obviously included in the scope of the present invention.

(Information Recording/Reproducing Apparatus Using Driving Apparatus) Next, with reference to FIG. 8 to FIG. 11, an explanation will be given on an information recording/reproducing apparatus using the driving apparatus in the embodiments described above. Incidentally, here, an explanation will be given on a ferroelectric recording/reproducing apparatus which performs a recording operation or a reproduction operation on the recording medium 40, which uses a ferroelectric substance as a recoding material.

(1) Basic Structure

Firstly, the basic structure of the dielectric recording/reproducing apparatus in this embodiment will be explained with reference to FIG. 8. FIG. 8 is a block diagram conceptually showing the basic structure of the dielectric recording/reproducing apparatus in the embodiment.

A dielectric recording/reproducing apparatus 400 has a driving apparatus 1 provided with: a probe 12 which is put close to or contacts a recording medium 40; and the recording medium 40. Moreover, the driving apparatus 1 is further provided with a return electrode 50 for returning thereto a high-frequency signal for signal reproduction, which is applied from the probe 12. Moreover, the dielectric recording/reproducing apparatus 400 is provided with: an inductor L disposed between the probe 12 and the return electrode 50; an oscillator 413 which oscillates at a resonance frequency determined on the basis of the inductor L and a capacitance Cs of a portion which is polarized in accordance with record information and which is formed in a surface layer or inside of a dielectric material 41 under the probe 12; an alternating current (AC) signal generator 421 for applying an alternating electric field to detect the state of the polarization recorded in the dielectric material 41; a record signal generator 422 for recording the polarization state into the dielectric material 41; a switch 423 for changing the outputs of the AC signal generator 421 and the record signal generator 422; a HPF (High Pass Filter) 424; a demodulator 430 for demodulating a FM signal modulated by the capacitance corresponding to the polarization state owned by the dielectric material 41 under the probe 12; a signal detector 434 for detecting data from the demodulated signal; a tracking error detector 435 for detecting a tracking error signal from the demodulated signal; and the like.

The probe 12 is connected to the oscillator 413 through the HPF 424, and is connected to the AC signal generator 421 and the record signal generator 422 through the HPF 424 and the switch 423. Then, the probe 12 functions as an electrode for applying an electrical field to the dielectric material 41.

The return electrode 50 is an electrode for returning thereto a high-frequency electric field applied to the dielectric material 41 from the probe 12 (i.e. a resonance electric field from the oscillator 413), and is disposed so as to surround the probe 21. Incidentally, if the high-frequency electric field returns to the return electrode 50 without resistance, the shape and the arrangement of the return electrode 50 can be arbitrarily set.

Incidentally, in the embodiment, for simplification of explanation, only one probe 12 is shown in FIG. 1; however, actually, a plurality of probes 12 are provided. In this case, a plurality of AC signal generators 421 are provided correspondingly to the respective probes 12. Moreover, in order to discriminate reproduction signals corresponding to the respective AC signal generators 421 on the signal detector 434, a plurality of signal detectors 434 are provided, and the signal detectors 434 obtain reference signals from the respective AC signal generators 421, to thereby output the corresponding reproduction signals.

The inductor L is disposed between the probe 12 and the return electrode 50, and may be formed from a microstripline, for example. A resonance circuit 414 is constructed including the inductor L and the capacitance Cs. The inductance of the inductor L is determined such that this resonance frequency is approximately 1 GHz, for example.

The AC signal generator 421 applies an alternating electric field between the return electrode 50 and an electrode 42. Moreover, in the dielectric recording/reproducing apparatus which uses a plurality of probes 12, the frequencies of the alternating electric fields are used as reference signals, to thereby discriminate signals detected on the probes 12. The frequencies are centered on about 10 kHz. In that condition, the alternating electric fields are applied to the micro domains of the dielectric material 41.

The oscillator 413 is an oscillator which oscillates at the resonance frequency determined from the inductor L and the capacitance Cs. The oscillation frequency varies, depending on the change of the capacitance Cs. Therefore, FM modulation is performed correspondingly to the change of the capacitance Cs determined by a polarization domain corresponding to the recorded data. By demodulating this FM modulation, it is possible to read the data recorded in the dielectric recording medium 40.

Incidentally, as described in detail later, the probe 12, the return electrode 50, the oscillator 413, the inductor L, the HPF 424, and the capacitance Cs in the dielectric material 41 constitute the resonance circuit 414, and the FM signal amplified in the oscillator 413 is outputted to the demodulator 430.

The record signal generator 422 generates a signal for recording and supplies it to the probe 12 at the time of recording. This signal is not limited to a digital signal and it may be an analog signal. The signal includes various signals, such as audio information, video information, and digital data for a computer. Moreover, the AC signal superimposed on the record signal is used to discriminate and reproduce the information on each probe, as the reference signal at the time of signal reproduction.

The switch 423 selects the output so as to supply, to the probe 12, the signal from the AC signal generator 421 at the time of reproduction and the signal from the record signal generator 423 at the time of recording. For this apparatus, a mechanical relay and a semiconductor circuit are used. The switch 423 is preferably constructed from the relay in the case of the analog signal, and the semiconductor circuit in the case of the digital signal.

The HPF 424 includes an inductor and a condenser, and is used to form a high pass filter for cutting off a signal system so that the signals from the AC signal generator 421 and the record signal generator 423 do not interfere with the oscillation of the oscillator 413. The cutoff frequency is $f=\frac{1}{2}\pi\sqrt{\{LC\}}$. Here, L is the inductance of the inductor included in the HPF 424, and C is the capacitance of the condenser included in the HPF 424. The frequency of the AC signal is about 100 KHz, and the oscillation frequency of the oscillator 413 is about 1 GHz. Thus, the separation is sufficiently performed on a first order LC filter. A higher-order filter may be used, but that increases the number of elements and possibly increases the apparatus size.

The demodulator 430 demodulates the FM signal, which is converted to the intermediate frequency, and reconstructs a waveform corresponding to the polarized state of a portion which is traced by the probe 12. If the recorded data are digital data of "0" and "1", there are two types of frequencies to be demodulated. By judging the frequency, the data reproduction is easily performed.

The signal detector 434 reproduces the recorded data from the signal demodulated on the demodulator 430. A lock-in amplifier is used as the signal detector 434, for example, and coherent detection or synchronized detection is performed on the basis of the frequency of the alternating electric field of the AC signal generator 421, to thereby reproduce the data. Incidentally, it will be obvious that another phase detection device may be used.

The tracking error detector 435 detects a tracking error signal for controlling the apparatus, from the signal demodulated on the demodulator 430. The detected tracking error signal is inputted into a tracking mechanism for the control.

Next, one example of the recording medium 40 using the dielectric material shown in FIG. 8 will be explained with reference to FIGS. 9. FIGS. 9 are a plan view and a cross sectional view conceptually showing one example of the recording medium 40 used in the embodiment.

As shown in FIG. 9(a), the recording medium 40 has e.g. a square shape. By relatively displacing the aforementioned probe 12 on the recoding surface of the recording medium 40, the data is recorded onto the recording medium 40, or the data recorded on the recording medium 40 is reproduced.

Moreover, as shown in FIG. 9(b), the recording medium 40 is formed such that the electrode 42 is laminated on a substrate 43 and that the dielectric material 41 is laminated on the electrode 42.

The substrate 43 is Si (silicon), for example, which is a preferable material in its strength, chemical stability, workability, or the like. The electrode 42 is intended to generate an electric field between the probe 12 (or the return electrode 50). By applying the electric field that is equal to or stronger than the coercive electric field of the dielectric material 41 to the dielectric material 41, the polarization direction is determined. By determining the polarization direction in accordance with the data, the recording is performed.

The dielectric material 41 is formed by a known technology, such as spattering $LiTaO_3$ or the like, which is a ferroelectric substance, onto the electrode 42. Then, the recording is performed with respect to the Z surface of $LiTaO_3$ in which the plus and minus surfaces of the polarization have a 180-degree domain relationship. It is obvious that another dielectric material may be used. In the dielectric material 41, the small polarization is formed at high speed, by a voltage for data, which is applied simultaneously with a direct current bias voltage.

(ii) Operation Principle

Next, with reference to FIG. 10 and FIG. 11, the operation principle of the dielectric recording/reproducing apparatus 400 in the embodiment will be explained. Incidentally, in the explanation below, one portion of the constituent elements of the dielectric recording/reproducing apparatus 400 shown in FIG. 8 is extracted and explained.

Recording Operation

Firstly, with reference to FIG. 10, the recording operation of the dielectric recording/reproducing apparatus 400 in the embodiment will be explained. FIG. 10 is a cross sectional view conceptually showing the data recording operation.

As shown in FIG. 10, by applying an electric field which exceeds the coercive electric field of the dielectric material 41 between the probe 12 and the electrode 42, the dielectric material 41 is polarized having a direction corresponding to the direction of the applied electric field. Then, by controlling an applying voltage to thereby change the polarization direction, it is possible to record the predetermined information. This uses such a characteristic that if an electric field which exceeds the coercive electric field of a dielectric substance is applied to the dielectric substance (particularly, a ferroelectric substance), the polarization direction is reversed, and that the polarization direction is maintained after that.

For example, it is assumed that the micro domain has downward polarization P by applying an electric field which directs from the probe 12 to the electrode 42, and that the micro domain has upward polarization P by applying an electric field which directs from the electrode 12 to the probe 42. This corresponds to the state that the data information is recorded. If the probe 12 is operated in an arrow-pointing direction, a detection voltage corresponds to the polarization P and is outputted as a square wave which swings up and down.

Reproduction Operation

Next, with reference to FIG. 11, the reproduction operation of the dielectric recording/reproducing apparatus 400 in the embodiment will be explained. FIG. 11 is a cross sectional view conceptually showing the data reproduction operation.

The nonlinear dielectric constant of a dielectric substance changes in accordance with the polarization direction of the dielectric substance. The nonlinear dielectric constant of the dielectric substance can be detected as a difference in the capacitance of the dielectric substance or a difference in the capacitance change, when an electric field is applied to the dielectric substance. Therefore, by applying an electric field to the dielectric material and by detecting a difference in the capacitance Cs or a difference in the change of the capacitance Cs in a certain domain of the dielectric material at that time, it is possible to read and reproduce the data recorded as the polarization direction of the dielectric material.

Specifically, firstly, as shown in FIG. 11, an alternating electric field from the not-illustrated AC signal generator 421 is applied between the electrode 42 and the probe 12. The alternating electric field has an electric field strength which does not exceed the coercive electric field of the dielectric material 41, and has a frequency of approximately 100 kHz, for example. The alternating electric field is generated mainly to discriminate the difference in the capacitance change corresponding to the polarization direction of the dielectric material 41. Incidentally, instead of the alternating electric field, a direct current bias voltage may be applied to form an electric field in the dielectric material 41. The application of the alternating electric field causes the generation of an electric field in the dielectric material 41 of the recording medium 40.

Then, the probe 12 is put closer to a recording surface until the distance between the tip of the probe 12 and the recording surface becomes extremely small on the order of nanometers. Under this condition, the oscillator 413 is driven. Incidentally, in order to detect the capacitance Cs of the dielectric material 41 under the probe 12 highly accurately, it is preferable to contact the probe 12 with the surface of the dielectric material 41, i.e. the recording surface. However, even if the tip of the probe 12 is not contacted with the recording surface, for example, even if the tip of the probe 12 is put closer to the recording surface to the extent that it can be substantially regarded as the contact, the reproduction operation (and moreover, the aforementioned recoding operation) can be performed.

Then, the oscillator 413 oscillates at the resonance frequency of the resonance circuit, which includes the inductor L and the capacitance Cs associated with the dielectric material 41 under the probe 12 as the constituent factors. The center frequency of the resonance frequency is set to approximately 1 GHz, as described above.

Here, the return electrode 50 and the probe 12 constitute one portion of the oscillation circuit 414 including the oscillator 413. The high-frequency signal of approximately 1 GHz, which is applied to the dielectric material 41 from the probe 12, passes through the dielectric material 41 and returns to the return electrode 50, as shown by solid lines in FIG. 11. By disposing the return electrode 50 in the vicinity of the probe 12 and shortening a feedback route to the oscillation circuit including the oscillator 413, it is possible to reduce noise (e.g. a floating capacitance component) entering the oscillation circuit.

In addition, the change of the capacitance Cs corresponding to the nonlinear dielectric constant of the dielectric material 41 is extremely small, and in order to detect this change, it is necessary to adopt a detection method having high detection accuracy. In a detection method using FM modulation, the high detection accuracy can be generally obtained, but it is necessary to further improve the detection accuracy, in order to make it possible to detect the small capacitance change corresponding to the nonlinear dielectric constant of the dielectric material 41. Thus, in the dielectric recording/reproducing apparatus 400 in the embodiment (i.e. recording/reproducing apparatus which uses the SNDM principle), the return electrode 50 is located in the vicinity of the probe 12 to shorten the feedback route to the oscillation circuit as much as possible. By this it is possible to obtain extremely high. detection accuracy, and thus it is possible to detect the small capacitance change corresponding to the nonlinear dielectric constant of the dielectric substance.

After the oscillator 413 is driven, the probe 12 is displaced in parallel with the recording surface on the dielectric recording medium 40. Since the polarization state of the domain of the dielectric material 41 under the probe 12 varies depending on the recorded signal, the nonlinear component of a dielectric constant under the probe 12 changes. If the nonlinear component of the dielectric constant changes, a phase in change of the resonance frequency for the alternating electric field, i.e. the oscillation frequency of the oscillator 413, changes. As a result, the oscillator 413 outputs a signal which is FM-modulated on the basis of the change of the capacitance Cs.

This FM signal is frequency-voltage-converted by the demodulator 430. As a result, the change of the capacitance Cs is converted to the extent of the voltage. The change of the capacitance Cs corresponds to the nonlinear dielectric constant of the dielectric material 41, and the nonlinear dielectric constant corresponds to the polarization direction of the dielectric material 41, and the polarization direction corresponds to the data recorded in the dielectric material 41. Therefore, the signal obtained from the demodulator 430 is such a signal that the voltage changes in accordance with the data recorded in the recording medium 4. Moreover, the signal obtained from the demodulator 430 is supplied to the signal detector 434 and, for example, coherent detection or synchronized detection is performed, to thereby extract the data recorded in the recording medium 420.

At this time, on the signal detector 434, an alternating current signal 10. generated by the AG signal generator 421 is used as the reference signal. By this, for example, even if the signal obtained from the demodulator 430 includes many noises or the data to be extracted is weak, the data can be extracted highly accurately by performing the synchronization with the reference signal, as described later.

In particular, the dielectric recording/reproducing apparatus in the embodiment is provided with the aforementioned driving apparatus 1 or the like, so that it is possible to record the data onto the recording medium 40 using the dielectric material or reproduce the data recorded on the recording medium 40, while receiving the various benefits of the aforementioned driving apparatus 1 or the like.

Incidentally, the dielectric recording/reproducing apparatus 400 may be provide with the driving apparatus 2 in the second embodiment or the driving apparatus 3 in the third embodiment, instead of the driving apparatus 1 in the first embodiment. Even in this case, it is possible to record the data onto the recording medium 40 using the dielectric material or reproduce the data recorded on the recording medium 40, while receiving the various benefits of the aforementioned driving apparatus 2 or 3 or the like.

MODIFIED EXAMPLES

Next, an explanation will be given on modified examples of the driving apparatus 1 in view of the properties of the dielectric recording/reproducing apparatus 400 when the aforementioned driving apparatus 1 or the like is used for the dielectric recording/reproducing apparatus 400.

(1) First Modified Example

Firstly, with reference to FIG. 12, a driving apparatus 4 in a first modified example will be explained. FIG. 12 is a cross sectional view schematically showing the basic structure of the driving apparatus in the first modified example.

As shown in FIG. 12, the driving apparatus 4 in the first modified example is provided with: an upper member 11; a plurality of probes 12; first electrodes 13; projecting portions (rib) 14; a lower member 21; a stage 22; second electrodes 23; a position sensor 24; actuators 25; side walls 30; and a recording medium 40, as in the driving apparatus 1 in the first embodiment. In the driving apparatus 4 in the first modified example, in particular, the second electrode 23 is electrically connected to an electrode 42 of the recording medium 40. In addition, a voltage having a different potential from that of the electrode 42 when the data recorded on the recording medium 40 is reproduced is applied to the first electrode 13 through a predetermined resistance. Here, for example, a voltage of "+5V" is applied through a resistance.

An aspect of the operation of the driving apparatus 4 in the first modified example having such a structure will be explained. If the first electrode 13 comes in contact with the second electrode 23 (i.e. the projecting portion 14 comes in contact with or bumps into the side surface of the stage 22) by displacing the stage 22, the electrical potential of the electrode 42 of the recording medium 40 is changed because of the voltage applied to the first electrode 13. That is, an offset is applied to the voltage applied to the recording medium 40 from each probe 12. As a result, an offset is applied uniformly to the frequency of the reproduction signal obtained from each probe 12 (i.e. the frequency is shifted all together). By monitoring the frequency of the reproduction signal obtained from each probe 12 and detecting that the offset is generated uniformly, the driving apparatus 4 (in other words, the dielectric recording/reproducing apparatus 400) can recognize that the projecting portion 14 comes into contact with the side surface of the stage 22. Therefore, it is possible to set the position where the offset is generated uniformly with regard to the frequency of the reproduction signal obtained from teach probe 12, as the reference position which is used when the amount of displacement of the stage 22 is detected. As a result, it is possible to receive the aforementioned various benefits. In other words, it is possible to recognize the reference position which is used when the amount of displacement of the stage 22 is detected, on the basis of a change in the properties of the reproduction signal obtained from each probe 12, and as a result, it is possible to receive the aforementioned various benefits.

In addition, it is possible to monitor the reproduction signal obtained from each probe 12 by using the structure of the dielectric recording/reproducing apparatus 400 described above. Thus, the dielectric recording/reproducing apparatus 400 can receive the aforementioned various benefits without newly employing an independent constituent element. Moreover, there is also such an advantage that it is unnecessary to newly install wiring or the like on the stage 22 side.

Moreover, since the voltage is applied to the first electrode 13 through the resistance, it is possible to preferably prevent such a disadvantage that an electric current is flown to a voltage application source (specifically the AC signal generator 421) of the recording medium 40 from the first electrode 13 because of the contact between the first electrode 13 and the second electrode 23.

Incidentally, in the dielectric recording/reproducing apparatus 400, since the alternating electric field is applied to the recording medium 40 from each probe 12, an offset is applied to the voltage of the alternating electric field applied from each probe 12 because of the contact between the first electrode 13 and the second electrode 23. If the offset is applied to the applied alternating electric field, an offset is also applied uniformly to the voltage of an oscillation signal of the oscillation circuit 414. Note that the application of the offset does not influence the reproduction of the data recorded on the recording medium 40, because the offset is applied in each probe 12.

Moreover, in the aforementioned first modified example, the operation at the time of data reproduction is explained; however, even in the operation at the time of data recording, similarly, it is possible to receive the aforementioned various benefits by monitoring a change in the voltage of a recording signal or the like.

Moreover, it is obvious that the various structures in the first to third embodiments described above can be combined. Moreover, even if they are combined as described above, it is possible to receive the aforementioned various benefits. Thus, that is obviously included in the scope of the present invention.

(2) Second Modified Example

Next, with reference to FIG. 13, a driving apparatus 5 in a second modified example will be explained. FIG. 13 is a cross sectional view schematically showing the basic structure of the driving apparatus in the second modified example.

As shown in FIG. 13, the driving apparatus 5 in the second modified example is provided with: an upper member 11; a plurality of probes 12; first electrodes 13; projecting portions (rib) 14; a lower member 21; a stage 22; second electrodes 23; a position sensor 24; actuators 25; side walls 30; and a recording medium 40, as in the driving apparatus 1 in the first embodiment. In the driving apparatus 5 in the second modified example, in particular, two of the plurality of probes 12, which are located on both sides, act as the first electrode 13 and the projecting portion 14 described above. By virtue of such construction, the dielectric recording/reproducing apparatus 400 can receive the aforementioned various benefits without newly employing an independent constituent element.

Incidentally, it is obvious that the various structures in the first to third embodiments described above can be combined. Moreover, even if they are combined as described above, it is possible to receive the aforementioned various benefits. Thus, that is obviously included in the scope of the present invention.

Moreover, in the present invention, various changes may be made, if desired, without departing from the essence or spirit of the invention which can be read from the claims and the entire specification. A driving apparatus, which involves such changes, is also intended to be within the technical scope of the present invention.

INDUSTRIAL APPLICABILITY

The driving apparatus of the present invention can be applied to a driving apparatus for scanning the surface or the like of a medium with a probe while driving the medium or the like in a single-axial direction or a dual-axial direction.

The invention claimed is:
1. A driving apparatus comprising:
a stage structure on which a medium having a small recording domain is mounted; and
a facing structure which is provided with at least one small action structure, which faces the medium, for performing a predetermined action to the medium, and which is displaced relatively on a predetermined flat surface with respect to said stage structure,
said facing structure comprising a facing-side position detecting unit for detecting a relative reference position of said facing structure with respect to said stage structure,
said stage structure comprising a stage-side position detecting unit for detecting a relative reference position of said facing structure with respect to said stage structure,
wherein:
said facing structure comprises a probe for performing at least one of recording of information onto the medium and reproduction of the information recorded on the medium, as the action structure, the probe performs at least one of the recording and the reproduction by applying an electric field to the medium, the medium comprises a back electrode, the facing-side position detecting unit comprises a position detecting electrode, and the stage-side position detecting unit comprises a position detecting electrode which has electrical continuity with the back electrode.

2. A driving apparatus comprising:

a stage structure on which a medium having a small recording domain is mounted; and a facing structure which is provided with at least one small action structure, which faces the medium, for performing a predetermined action to the medium, and which is displaced relatively on a predetermined flat surface with respect to said stage structure, said facing structure comprising a facing-side position detecting unit for detecting a relative reference position of said facing structure with respect to said stage structure, said stage structure comprising a stage-side position detecting unit for detecting a relative reference position of said facing structure with respect to said stage structure, wherein the stage-side position detecting unit includes a reference surface which crosses the predetermined flat surface at right angles, and the facing-side position detecting unit includes a projection portion which can contact the reference surface along with the relative displacement of said facing structure with respect to said stage structure and which projects with respect to said stage structure.

3. The driving apparatus according to claim 2, wherein at least one portion of the stage-side position detecting unit is formed of a same member as a member of said stage structure, and at least one portion of the facing-side position detecting unit is formed of a same member as a member of said facing structure.

4. The driving apparatus according to claim 2, wherein at least one portion of the stage-side position detecting unit is unified with said stage structure, and at least one portion of the facing-side position detecting unit is unified with said facing structure.

5. A driving apparatus comprising:

a stage structure on which a medium having a small recording domain is mounted; and a facing structure which is provided with at least one small action structure, which faces the medium, for performing a predetermined action to the medium, and which is displaced relatively on a predetermined flat surface with respect to said stage structure, said facing structure comprising a facing-side position detecting unit for detecting a relative reference position of said facing structure with respect to said stage structure, said stage structure comprising a stage-side position detecting unit for detecting a relative reference position of said facing structure with respect to said stage structure, wherein the facing-side position detecting unit includes a reference surface which crosses the predetermined flat surface at right angles, and the stage-side position detecting unit includes a projection portion which can contact the reference surface along with the relative displacement of said facing structure with respect to said stage structure and which projects with respect to said facing structure.

6. The driving apparatus according to claim 5, wherein at least one portion of the facing-side position detecting unit is formed of a same member as a member of said facing structure, and at least one portion of the stage-side position detecting unit is formed of a same member as a member of said stage structure.

7. The driving apparatus according to claim 5, wherein at least one portion of the facing-side position detecting unit is unified with said facing structure, and at least one portion of the stage-side position detecting unit is unified with said stage structure.

8. The driving apparatus according to claim 1, wherein each of the facing-side position detecting unit and the stage-side position detecting unit comprises a position detecting electrode, and said driving apparatus further comprises a continuity detecting device for detecting electrical continuity between the position detecting electrode provided for the facing-side position detecting unit and the position detecting electrode provided for the stage-side position detecting unit.

9. The driving apparatus according to claim 1, wherein each of the facing-side position detecting unit and the stage-side position detecting unit comprises a position detecting electrode, and said driving apparatus further comprises a capacitance detecting device for detecting a capacitance between the position detecting electrode provided for the facing-side position detecting unit and the position detecting electrode provided for the stage-side position detecting unit.

10. The driving apparatus according to claim 1, wherein the relative reference position of said facing structure with respect to said stage structure is detected on the basis of a change in a probe signal obtained from the probe.

11. The driving apparatus according to claim 1, wherein said facing structure comprises the position detecting electrode provided for the facing-side position detecting unit, as the probe.

12. The driving apparatus according to claim 1, wherein said facing structure comprises at least one probe for measuring a property of at least one of a surface of the medium and an inside of the medium, as the action structure.

13. The driving apparatus according to claim 1, further comprising an amount-of-displacement detecting unit for detecting a relative amount of displacement of said facing structure with respect to said stage structure.

14. The driving apparatus according to claim 1, wherein said facing structure comprises a probe array including a plurality of probes for performing at least one of recording of information onto the medium and reproduction of the information recorded on the medium, or for measuring a property of at least one of a surface of the medium and an inside of the medium, as the action structure, and at least one of the stage-side position detecting unit and the facing-side position detecting unit is disposed on an outer side of an area occupied by the probe array.

* * * * *